(12) United States Patent  
Olmstead

(10) Patent No.: US 8,286,877 B2  
(45) Date of Patent: Oct. 16, 2012

(54) SYSTEM AND METHOD FOR DATA READING USING RASTER SCANNING

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 556 days.

(21) Appl. No.: 11/279,365

(22) Filed: Apr. 11, 2006

(65) Prior Publication Data

US 2006/0278708 A1    Dec. 14, 2006

Related U.S. Application Data

(60) Provisional application No. 60/872,402, filed on Jun. 13, 2005.

(51) Int. Cl.  
*G02B 5/00*    (2006.01)

(52) U.S. Cl. ............... 235/462.32; 235/454; 235/462.14

(58) Field of Classification Search .............. 235/462.32  
See application file for complete search history.

(56) References Cited

U.S. PATENT DOCUMENTS

| | | | | |
|---|---|---|---|---|
| 3,891,829 | A * | 6/1975 | Dobras | 235/462.04 |
| 4,713,532 | A | 12/1987 | Knowles et al. | |
| 5,019,714 | A | 5/1991 | Knowles | |
| 5,446,271 | A | 8/1995 | Cherry et al. | 235/462 |
| 5,495,097 | A * | 2/1996 | Katz et al. | 235/462.12 |
| 5,506,392 | A | 4/1996 | Barkan et al. | 235/472 |
| 5,627,366 | A | 5/1997 | Katz | 250/234 |
| 5,635,699 | A | 6/1997 | Cherry et al. | 235/462 |
| 5,663,549 | A | 9/1997 | Katz et al. | 235/462 |

(Continued)

FOREIGN PATENT DOCUMENTS

JP    63163585  A  *  7/1988

(Continued)

OTHER PUBLICATIONS

Supplementary Search Report Jun. 9, 2010 from EP Appl. No. 06 772 683.6 (corresponding to the present application).

*Primary Examiner* — Thien M Le  
*Assistant Examiner* — Tae Kim  
(74) *Attorney, Agent, or Firm* — Stoel Rives LLP

(57) ABSTRACT

The present disclosure provides systems of and methods for reading optical codes located on multiple sides of an item that is being moved through a read volume. In one method, optical symbols are read using a high speed raster laser beam and non-retrodirective collection optics including the steps of moving an item containing an optical code along an item direction past a window disposed in a surface of a scanner housing or platter; via a first scan mechanism, repeatedly scanning through the window at a first slant and/or tilt angle to the surface in a first direction and along a single line to acquire scanned data over two dimensions of one or more sides of the item; via a second scan mechanism, repeatedly scanning through the window at a second slant and/or tilt angle to the surface in a second direction and along a single line to acquire scanned data over two dimensions of one or more other sides of the item; and processing the scanned data acquired. The window may be formed in the shape of a slot, the slot being oriented generally transverse to the item direction A preferred construction is a completely solid state implementation using either a linear imager or an area (2-D) imager in the Scheimpflug condition to image a plane with a depth of field.

37 Claims, 12 Drawing Sheets

U.S. PATENT DOCUMENTS

| | | | |
|---|---|---|---|
| 5,814,803 A | 9/1998 | Olmstead et al. | |
| 6,015,089 A | 1/2000 | Hecht et al. | 235/462.16 |
| 6,042,012 A | 3/2000 | Olmstead et al. | |
| 6,142,376 A * | 11/2000 | Cherry et al. | 235/462.14 |
| 6,330,973 B1 * | 12/2001 | Bridgelall et al. | 235/462.45 |
| 6,347,002 B1 | 2/2002 | Hagelin et al. | 359/201 |
| 6,585,161 B1 | 7/2003 | Acosta | 235/462.4 |
| 6,603,588 B2 | 8/2003 | Hagelin et al. | 359/212 |
| 6,899,272 B2 | 5/2005 | Krichever et al. | |
| 6,994,255 B2 | 2/2006 | Acosta | 235/462.36 |
| 7,028,899 B2 | 4/2006 | Tsikos et al. | |
| 7,296,748 B2 * | 11/2007 | Good | 235/462.14 |
| 7,540,424 B2 | 6/2009 | Knowles et al. | |
| 2002/0043564 A1 * | 4/2002 | Ohkawa et al. | 235/462.4 |
| 2006/0022051 A1 | 2/2006 | Patel et al. | |
| 2006/0081712 A1 | 4/2006 | Rudeen et al. | 235/462.08 |
| 2006/0278712 A1 | 12/2006 | Olmstead et al. | |
| 2006/0278713 A1 | 12/2006 | Olmstead et al. | 235/462.37 |
| 2007/0080228 A1 | 4/2007 | Knowles et al. | |
| 2009/0001166 A1 | 1/2009 | Barkan et al. | |

FOREIGN PATENT DOCUMENTS

| | | |
|---|---|---|
| WO | WO 03/057396 | 7/2003 |

* cited by examiner

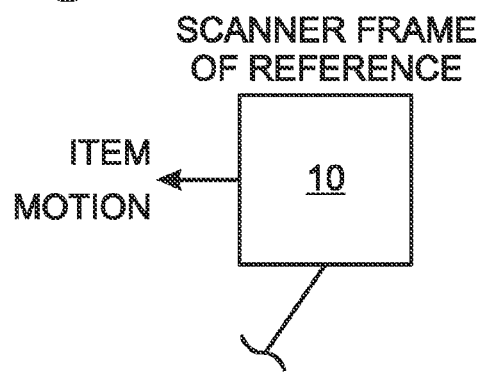
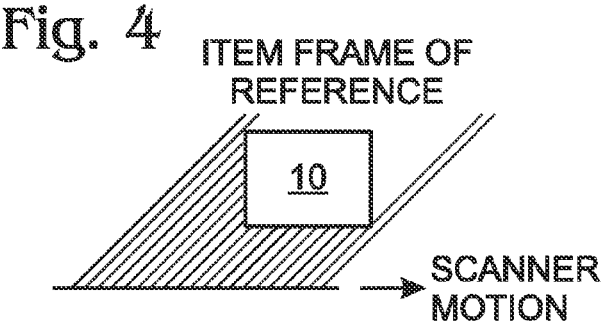
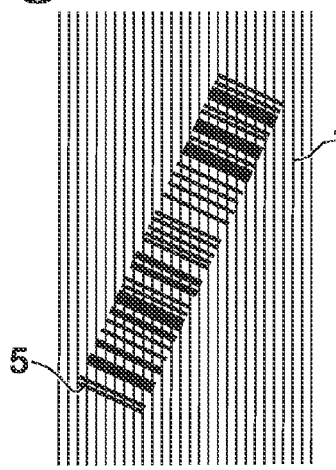
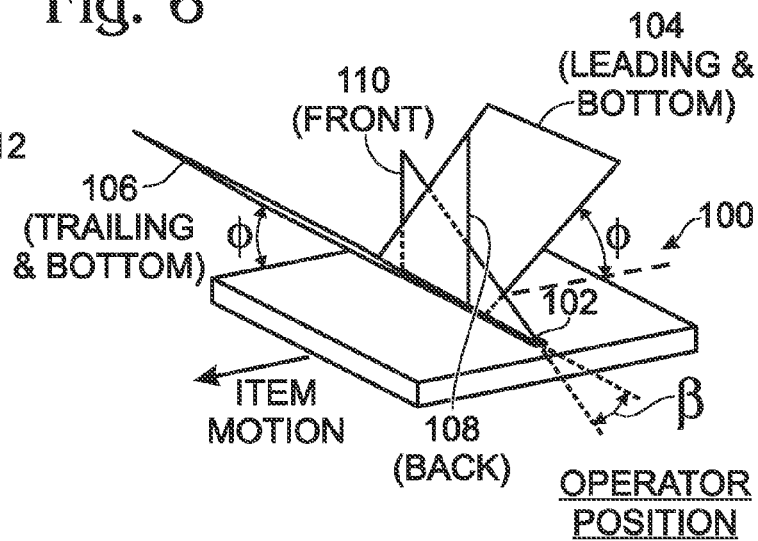
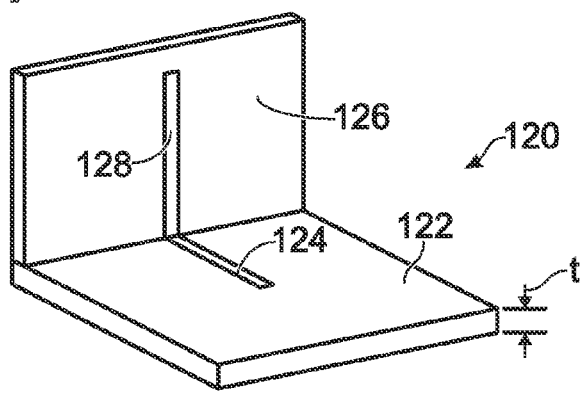

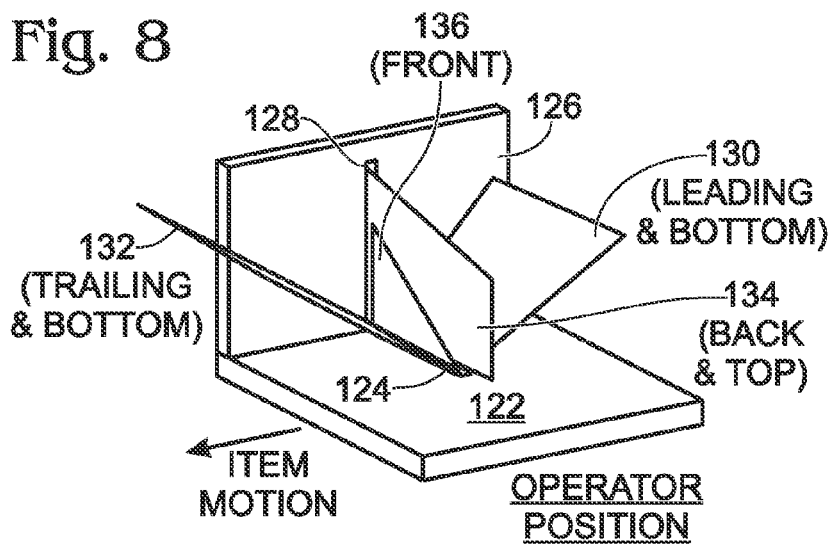
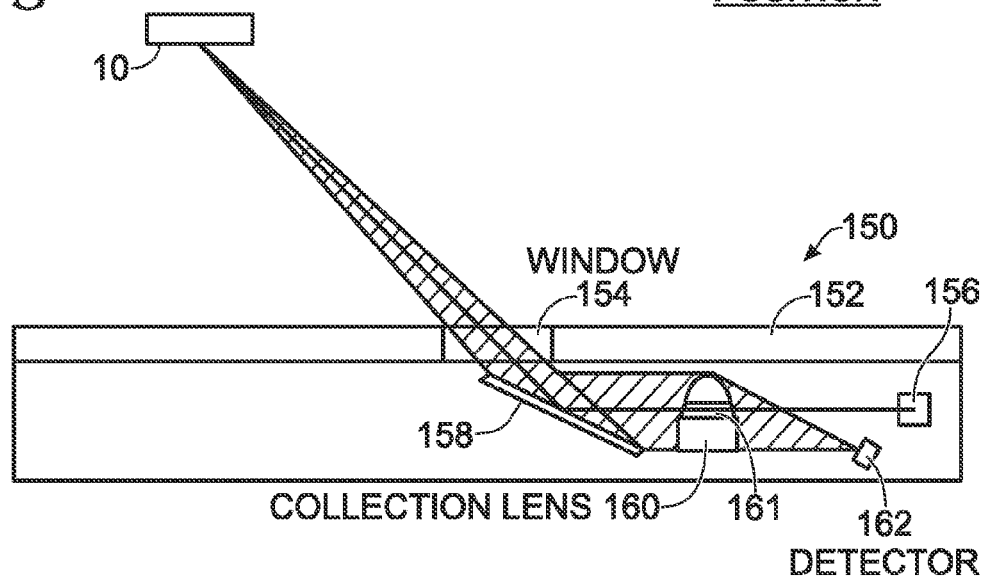
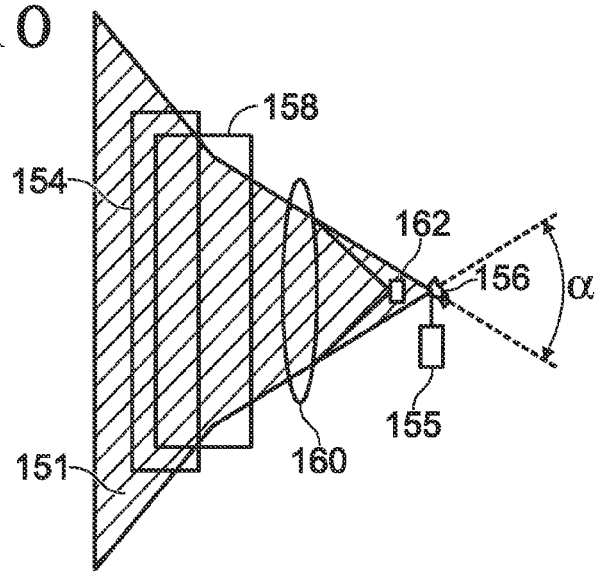

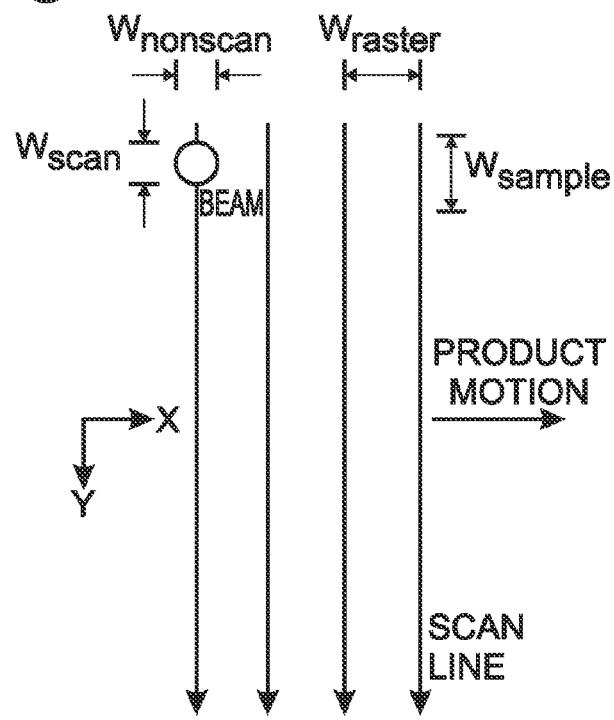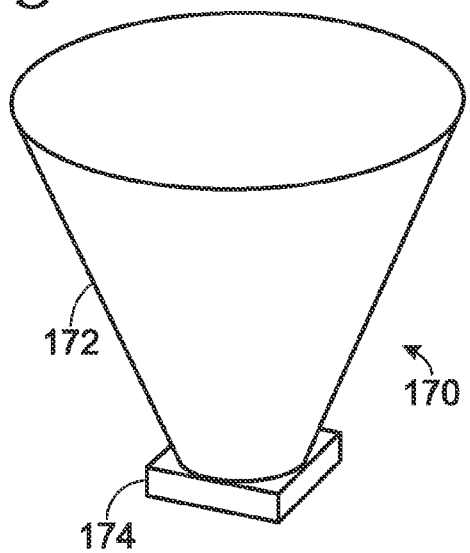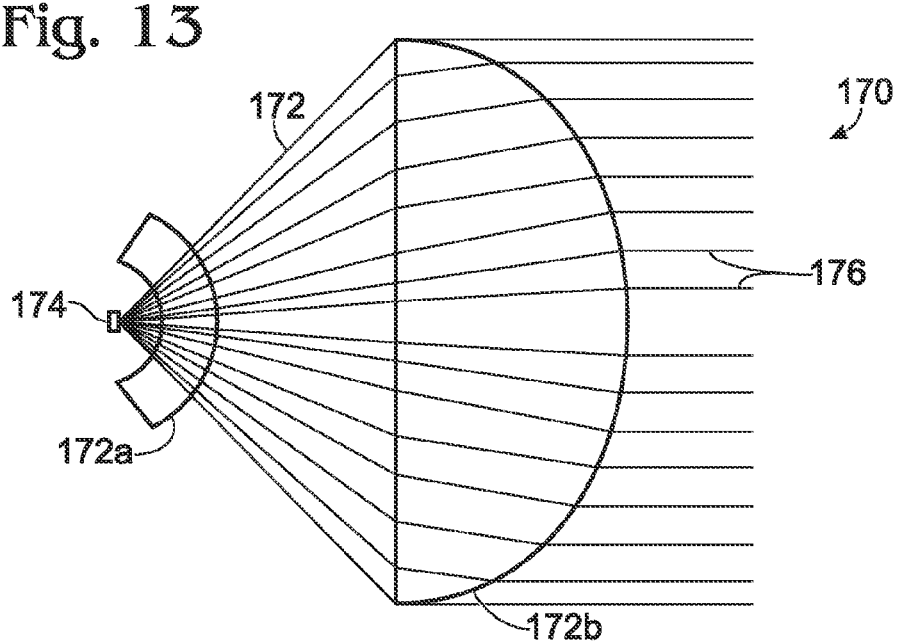

V = 100 IPS
N = 2 LINES
θ = 45 DEG

V = 50 IPS
N = 4 LINES
θ = 27 DEG

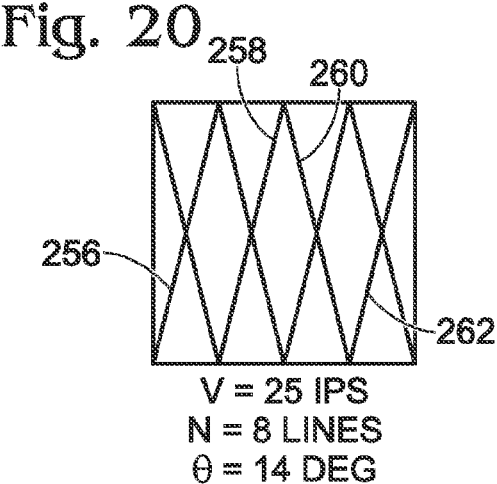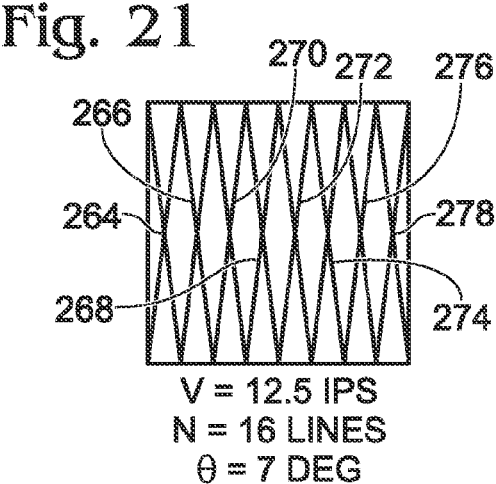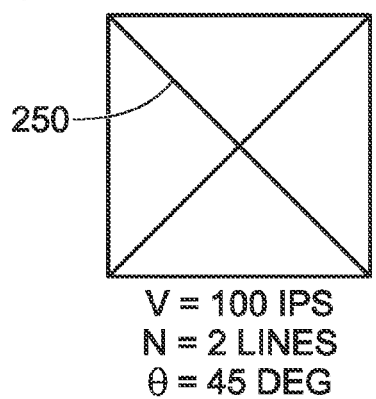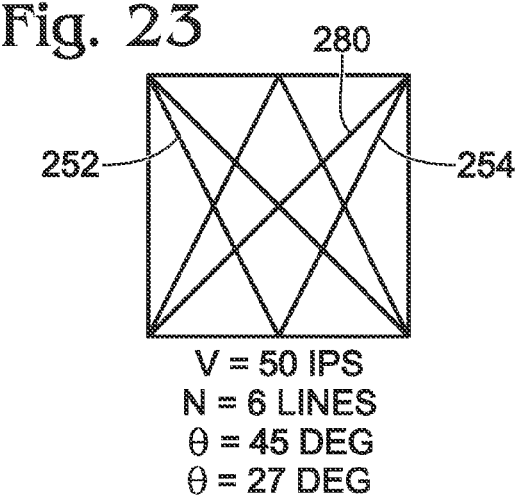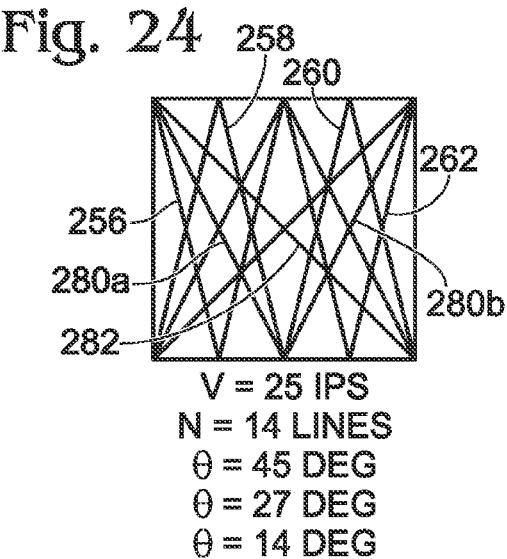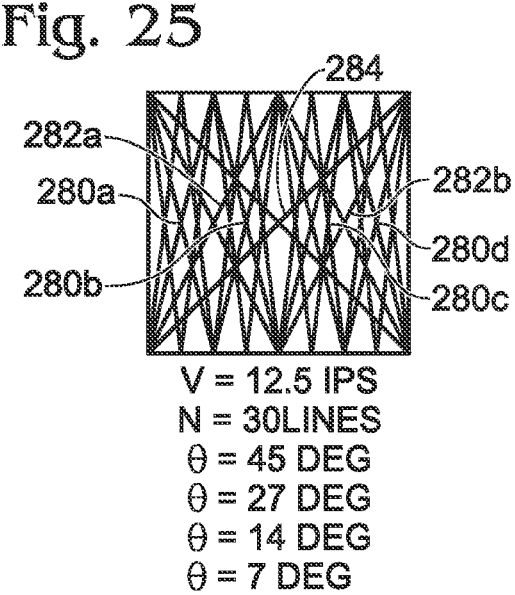

V = 100 IPS
θ = 45 DEG

V = 50 IPS
θ = 45 DEG
θ = 27 DEG

V = 25 IPS
θ = 45 DEG
θ = 27 DEG
θ = 14 DEG

V = 12.5 IPS
θ = 45 DEG
θ = 27 DEG
θ = 14 DEG
θ = 7 DEG

V = 100 IPS
θ = 45 DEG

V = 100 IPS
θ = 63 DEG

V = 100 IPS
θ = 76 DEG

θ = 45 DEG
N = 1 L/A

θ = 45 DEG
N = 2 L/A

θ = 45 DEG
N = 4 L/A

θ = 45 DEG
N = 8 L/A

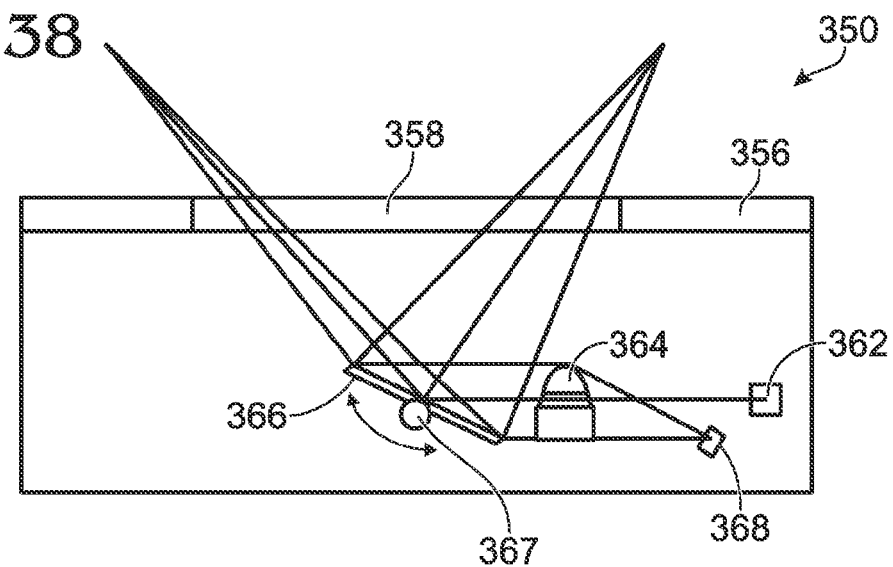
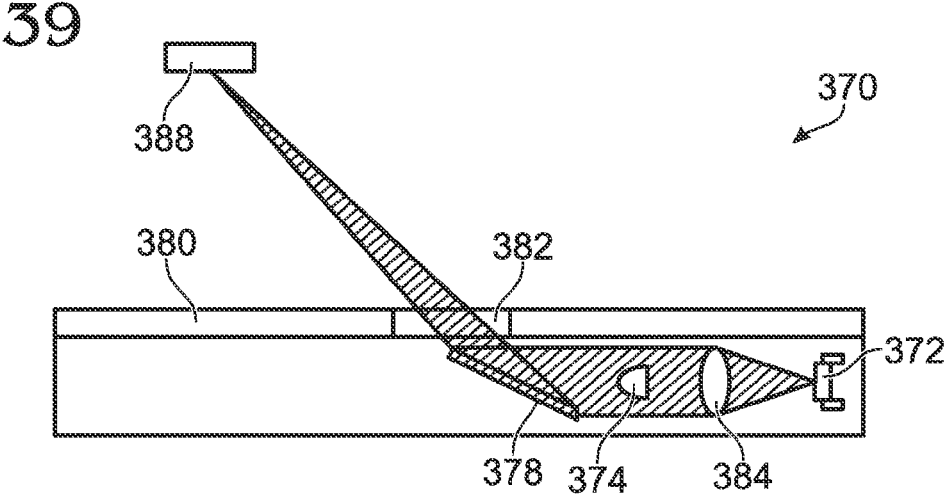
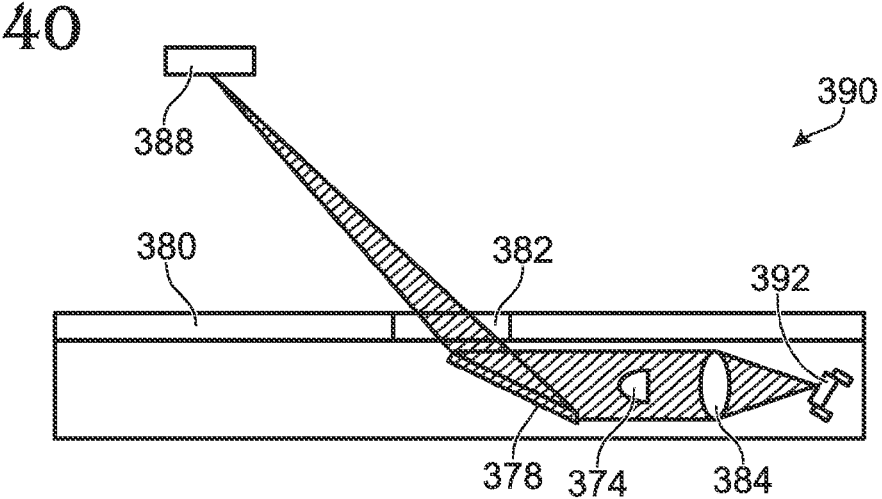

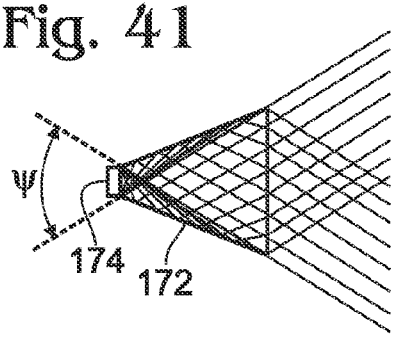
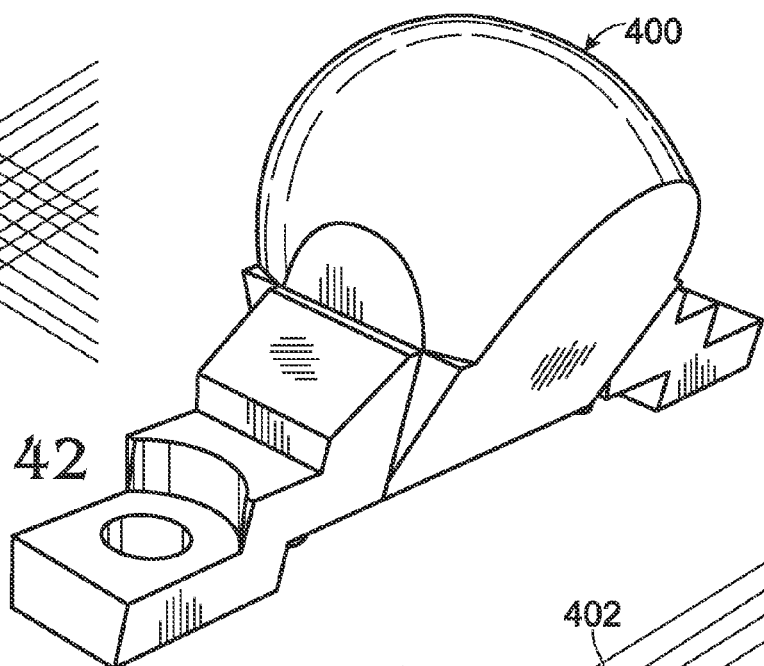
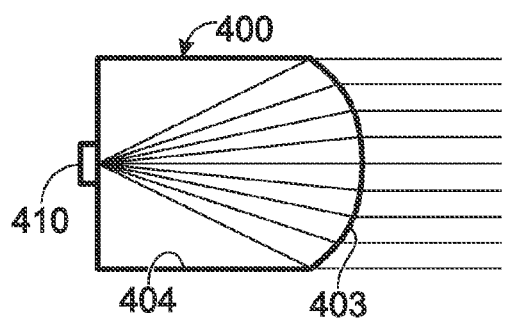
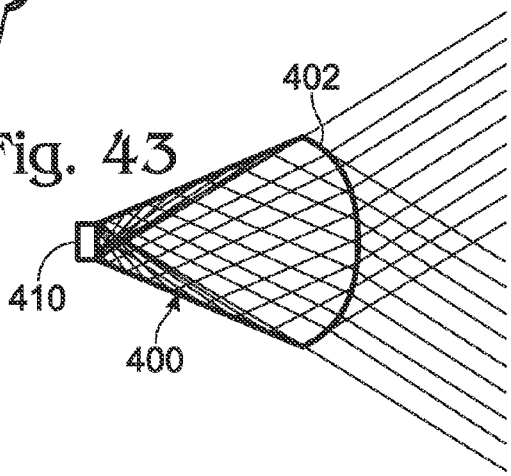
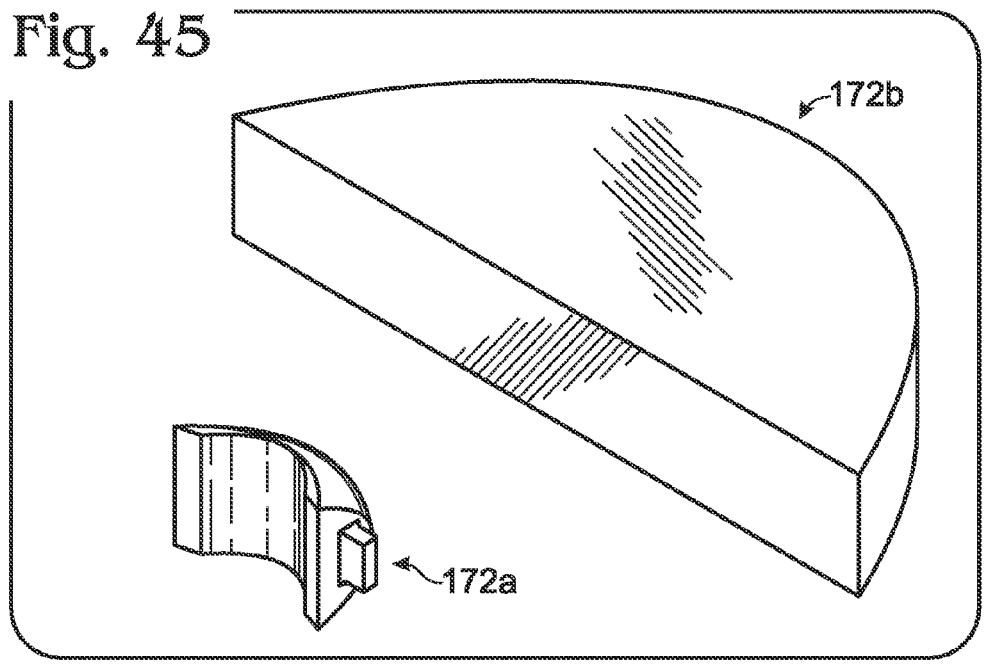

SYSTEM AND METHOD FOR DATA READING USING RASTER SCANNING

RELATED APPLICATION DATA

This application claims priority to U.S. application No. 60/872,402, filed on Jun. 13, 2005, hereby incorporated by reference.

BACKGROUND

The field of the present disclosure relates to optical readers and methods of data reading, and more particularly, to methods and systems using a small number of high speed scan lines to generate a raster image of an optical code.

Conventional fixed scanners use a motor/facet wheel to scan a laser beam across a plurality of pattern mirrors in order to generate an omnidirectional scan pattern. FIG. 1 illustrates a schematic of a conventional fixed scanner 10. The scanner 10 includes a laser diode 15 generating a laser beam 17 which is directed onto a facet wheel 20. The facet wheel 20 is rotatably driven by a motor 21 at a relatively high speed, typically several thousand rpm. The facet wheel 20 scans the beam across a plurality of pattern mirrors 22 (only one pattern mirror is shown) with the scanned beam reflecting off one or more patterns mirrors to form scan lines projected through a window 24 and into a scan volume.

Return light reflecting off the barcode 5 is collected retrodirectively onto the pattern mirrors 22, the facet wheel 20, and then onto a collection mirror 26 (or alternately a lens) by which it is focused toward a detector 28.

Multiple scan lines are generated forming an omnidirectional scan pattern designed to be capable of scanning a barcode passing through the scan volume in any orientation. An important aspect of scanning efficiency is side coverage, that is, which sides of an item can be scanned, the item being defined as a six-sided cube or six-sided rectangular box-shaped form. L-scanners have been employed to enhance item side coverage. An L-scanner, such as the Magellan® 8500 scanner manufactured by PSC Inc. of Eugene, Oreg., has two windows oriented in a generally "L" shape, one window oriented generally vertically and one window oriented generally horizontally. The Magellan® 8500 scanner has the unique capability of scanning all six sides of an item: (1) the bottom side is scanned primarily by scan lines from the horizontal window; (2) the leading side (i.e. the left side assuming a right-to-left scanning direction) is scanned by scan lines from both the vertical window and the horizontal window; (3) the trailing side (i.e. the right side assuming a right-to-left scanning direction) is scanned by scan lines from both the vertical window and the horizontal window; (4) the front side (i.e. the side facing the vertical window) is scanned by scan lines from the vertical window; (5) the rear or checker side (the side facing opposite the vertical window) is scanned by scan lines from the horizontal window; (6) the top side (the side facing opposite the horizontal window) is scanned by scan lines from the vertical window.

FIG. 2 diagrammatically illustrates a scan pattern 30 generated through the horizontal window of a Magellan® 8500 scanner. The facet wheel of the Magellan® 8500 scanner is rotated at about 100 times per second (6000 rpm). The scan pattern is made of families (or groups) of generally parallel lines, due to the different angular positions of each facet on the facet wheel. For the Magellan® 8500, there are four facets, each arranged at a different angle relative to the rotational axis, so there are four parallel lines with each scan family. There are eight different pattern mirror sets on the horizontal window, leading to 32 scan lines, as shown in the pattern 30 of FIG. 2.

The scan pattern 30 is constrained by the use of families of parallel lines. A relatively large amount of physical space is needed to create the scan pattern. As illustrated in the system 10 of FIG. 1, there is significant depth to the product to contain the pattern mirrors and facet wheel. Depending on the scan engine design, the product may be even deeper or longer to handle collection. The scan lines must emanate from a point laterally beyond the edges of the window, which requires the product to be wider than the window in both dimensions.

Because collection is retrodirective in the typical facet wheel scanner, the facet wheel needs to be quite large. Particularly because of the small number of facets (typically three or four), windage may also be large, causing a large power consumption of the motor/facet wheel assembly. A large facet wheel also produces a significant load on the bearings, affecting the lifetime of the motor. The optical quality of the reflective surfaces of the facet wheel is difficult to maintain, due to the high speed of rotation. In addition, care must be taken to ensure structural integrity of such a facet wheel due to the large stresses from high speed rotation.

Since the scan pattern reads barcodes by spatially covering the window to hit the product at all angles, the window must be fairly large. For scanners with a horizontal window, sapphire or other scratch-resistant surface is used to provide a surface that will last under the harsh environment of products sliding over the window. The cost of this window is quite high and thus is a significant cost factor in the product.

SUMMARY

The present disclosure is directed to method and systems of scanning optical codes on items being moved through a scan volume. Preferably the optical codes may be located on any side of an item and in any orientation. In a preferred embodiment, a raster image of the product is generated using a deflected laser beam and non-retrodirective collection optics.

Another embodiment is directed to a method of reading optical symbols including the steps of: moving an item containing an optical code along an item direction past the window; repeatedly reading through the window along a single scan line forming a scan plane (or read plane) to acquire, in combination with the movement of the item through the scan plane) a raster pattern over two dimensions; extracting a plurality patterns of virtual lines from the raster pattern, the virtual scan line patterns corresponding to different speeds of the item being passed through the scan volume; processing each of the virtual scan line patterns for decoding the optical code.

These and other aspects of the disclosure will become apparent from the following description, the description being used to illustrate preferred embodiments when read in conjunction with the accompanying drawings.

BRIEF DESCRIPTION OF THE DRAWINGS

FIG. 3 is a schematic of scanner frame of reference for a raster scanner.

FIG. 4 is a schematic of an item frame of reference for a raster scanner.

FIG. 5 illustrates raster scans of a barcode label.

FIG. 6 diagrammatically illustrates a raster scanner having a single slot.

FIGS. 7-8 diagrammatically illustrate an L-shaped raster scanner having multiple slots.

FIG. 9 diagrammatically illustrates a side elevation view of non-retrodirective collection mechanism according to a preferred embodiment.

FIG. 10 is a top view of the mechanism of FIG. 9.

FIG. 11 is a diagram of scanning resolution parameters.

FIG. 12 is a perspective view of a collection system including a compound parabolic concentrator.

FIG. 13 is a top view of an alternate embodiment collection lens system of FIG. 45.

FIGS. 18-21 are diagrams of scan patterns of a single X pattern at four different item speeds.

FIGS. 22-25 are diagrams of scan patterns of an X pattern with additional scan lines at four different item speeds.

FIG. 38 is a schematic diagram of a scan mechanism for the scanner of FIG. 37.

FIG. 39 is a schematic diagram of a line imaging raster scanner according to an alternate embodiment.

FIG. 40 is a schematic diagram of a line imaging raster scanner according to an alternate embodiment employing Scheimpflug optics.

FIG. 41 is a cross sectional view and simplified ray trace of a concentrator element.

FIG. 42 is a perspective view of a collection lens according to a preferred embodiment.

FIG. 43 is a simplified ray trace of the wide field (top view) axis of the collection lens of FIG. 42.

FIG. 44 is a simplified ray trace of the narrow field (side view) axis of the collection lens of FIG. 42.

FIG. 45 is a perspective view of an alternate embodiment collection lens system.

DETAILED DESCRIPTION OF THE PREFERRED EMBODIMENTS

Figure 1:
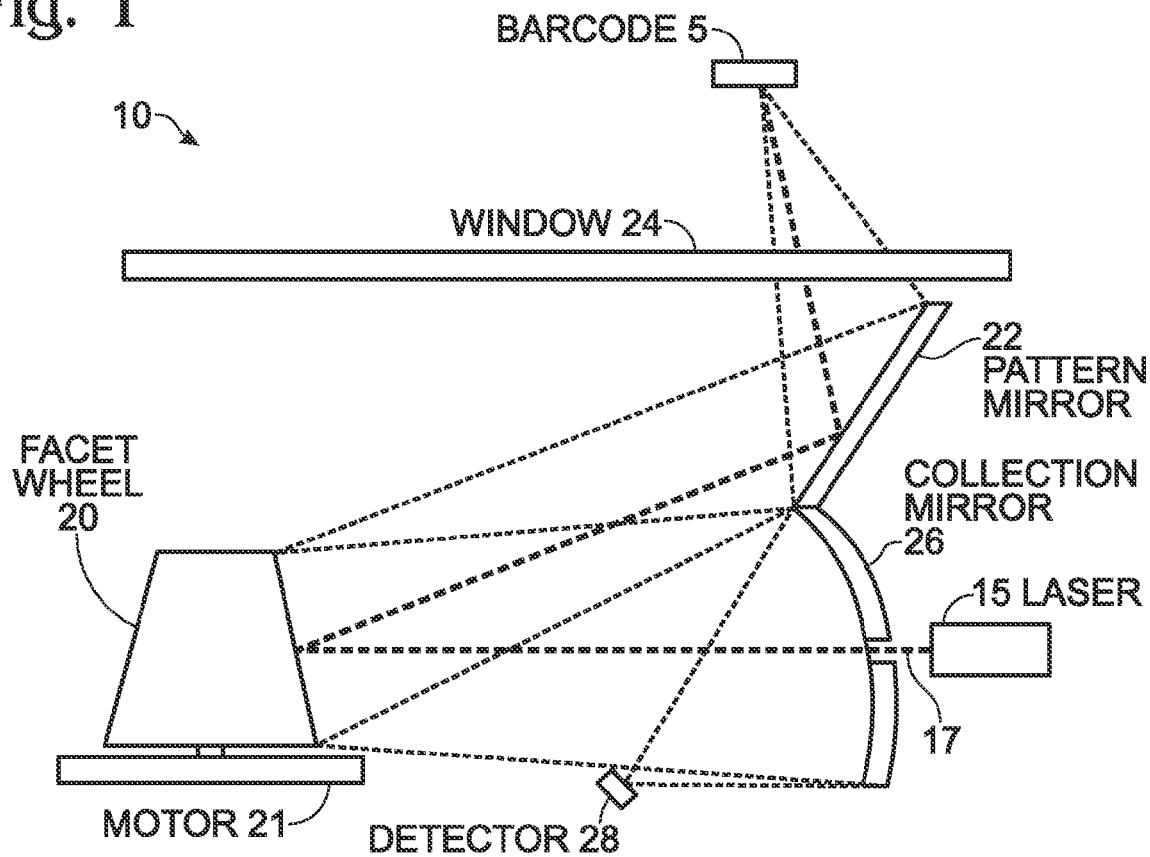
FIG. 1 is a schematic of a prior art scanning mechanism employing a facet wheel.
Figure 2:
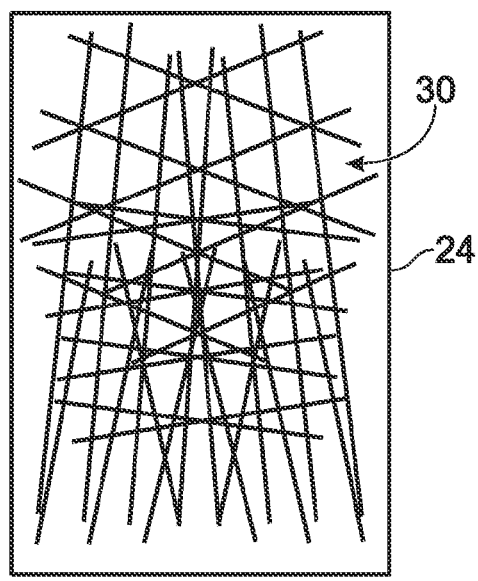
FIG. 2 illustrates a scan pattern at the horizontal window of the scanner of FIG. 1.

While certain preferred embodiments are described below with reference to a high speed raster scanner, one skilled in the art will recognize the principles described herein are viable to other applications. Though certain preferred embodiments will be described with respect to scanning barcodes, it should be understood that the principles described herein are applicable to other types of optical codes (e.g. 1-D, 2-D, Maxicode, PDF-417) as well as imaging of other items such as fingerprints.

In a preferred configuration, a raster scanner is disposed at a scan location, such as the checkout counter of a retail establishment, and items are passed through the scan field. Instead of generating a spatial scan pattern, a raster scanner according to a preferred embodiment generates a single scan line, aimed toward the item being passed through the scan field. The scan line forms a plane through which the item is passed. This scan line has a rapid repetition rate, compared to a conventional fixed scanner. Data gathered from this scan line creates a raster image, with the "Y" direction created by the scanning operation, and the "X" direction created by the movement of the product past the scan line.

The operation is similar to a fax machine. One difference is that the human operator moves the product past the scan line (i.e. through the scan plane), instead of a motorized belt moving the paper past the rastering mechanism of a fax machine. Another difference is that the raster scanner preferably images over a significantly larger depth of field. The irregularities in human motion of the product past the scan line will cause geometric distortions in the captured image, but as most human motion is relatively smooth, particularly at high speeds, this distortion is tolerable, as barcode information is tolerant of some distortion. It is noted that there are two different frames of reference (points of view) in optical code scanning, namely the item point of view and the scanner point of view. FIGS. 3-4 illustrate these two frames of reference. From the scanner frame of reference shown in FIG. 3, the scanner is repetitively sending out a single scan line while the product is moving past/through the plane of the scan line, thus changing the position of where the scan lines strike the product. From the item frame of reference shown in FIG. 4, the item is stationary and the barcode scanner is moving across it (in the opposite direction), providing many strikes across the product. The item frame of reference may be more helpful in understanding the scanner's operation.

Considering a product with a barcode on the bottom and using the item frame of reference from FIG. 4, the scan lines form a raster pattern 12 on the item, as shown in FIG. 5. This raster pattern 12 may be thought of as similar to how a fax machine operates. A line is scanned and converted to an intensity profile. Then the object/item is moved a certain distance and the process is repeated (i.e. another line is scanned) generating a multitude of lines resulting in a 2-D raster image. It is understood that while the extent of the image along the laser scan line is determined by the optics of the system, the other axis is of indeterminate extent as it is not known when a object will appear in the field of view. At a given item velocity and scan line repetition rate, a given line-to-line spacing results, defining the resolution in this axis (along with the laser spot size). At a given scan rate and the faster the item moves, the lower the resolution and the slower the item moves, the higher the resolution (until limited by the resolution due to the laser spot size).

In order to read multiple sides of an item, multiple raster patterns may be required. The three primary configurations for fixed optical code scanners are (1) a flat-top horizontal scanner; (2) a vertical scanner; and (3) an L-shaped scanner having both a horizontal component and a vertical component. Each of the configurations would preferably generate four scan lines in order to provide multi-sided reading, with the L-scanner preferably being able to read all six sides of an item.

FIG. 6 illustrates a horizontal scanner 100 having a single elongated slot 102 disposed perpendicularly to the direction of item movement through the scan volume. Were the scanner to comprise an integrated scanner-scale, the slot 102 would be disposed within the weigh platter. In this embodiment, the scanner 100 is described with respect to items being passed through the scan volume from right to left from the perspective of the operator, who is standing in front of the scanner near the front edge (the operator position being lower right side of the figure). The scanner 100 is provided with four scan line generators, each producing a scan line directed through the slot 102: (1) a leading scan line 104 (directed diagonally up and to the right), for reading the leading left side and the bottom side of an object swept across slot 102; (2) a trailing scan line 106 (directed diagonally up and to the left) for reading the trailing right side and the bottom side; (3) a front directed scan line 108 directed diagonally up and toward the operator for scanning the back side (i.e., the side facing opposite the operator) and possibly also the bottom side; and (4) a back directed scan line 110 directed diagonally up and away from the operator for scanning the front side (i.e., the side facing the operator) and possibly also the bottom side. Alternately, this single slot 102 may be oriented vertically to operate as a vertical scanner. This scanner may be configured to be convertible as between a vertical scanner or a horizontal scanner depending upon its mounting orientation. In another configuration, the scanner 100 may be configured horizontally with the slot 102 facing downward to operate as an overhead scanner.

The scan lines may alternately be described as scan planes or read planes as diagrammatically illustrated in FIG. 6. Scan line 110 is illustrated as a plane projecting through the slot 102 at a 90° slant angle to the horizontal (or 0° to the vertical), but projected with an angle of view at a tilt angle β such that scan line 110 is directed diagonally up and away from the operator. Where the item is a six-sided box, the scan line 110 would project onto the front side of the box (i.e. the side facing the operator) and possibly also the bottom side of the box. In order to project onto the front side of the box (i.e. a side of the box parallel to the item direction and perpendicular to the scanner surface, the scanner surface being a horizontal surface of the slot or window 102), the field of view for scan line 110 may be described as being from an end of the slot 102 proximate the operator.

Scan line 108 is illustrated as a plane projecting through the slot 102 at a 90° slant angle to the horizontal (or 0° to the vertical), but projected with a tilt angle (similar to the tilt angle β of scan line 110 but in the opposite direction) such that scan line 108 is directed diagonally up and toward the operator. Where the item being scanned is a six-sided box-shaped item, the scan line 108 would project onto the back side of the box (i.e. the side facing opposite the operator) and possibly also the bottom side of the box. In order to project onto the back side of the box, the field of view for scan line 108 may be described as being from an end of the slot 102 distal to the operator.

Scan line 104 is illustrated as a plane projecting through the slot 102 at a rearward (relative to the direction of item motion) slant angle Φ to the horizontal (or 90° minus Φ to the vertical). Preferably, the scan line 104 is projected at a 0° tilt angle such that scan line 104 is projected onto a bottom side and leading side of a six-sided box-shaped item being passed through the scan plane. Scan line 106 is illustrated as a plane projecting through the slot 102 at a forward (relative to the direction of item motion) slant angle Φ to the horizontal (or 90° minus Φ to the vertical). Preferably, the scan line 106 is projected at a 0° tilt angle such that scan line 106 is projected onto a bottom side and trailing side of a six-sided box-shaped item. The slant angle Φ may be any suitable angle that provides the desired field of view which may be different depending on the particular application. In certain applications, slant angle Φ is preferably about 45°, which provides equal angle of incidence on two sides of a box-shaped item, such as the leading and the bottom sides, for scan line 104. Alternately, actual angular values of the forward and rearward slant angles may be different from each other.

Depending upon the degree of coverage and pattern aggressiveness desired, a scanner may be configured with any combination of scan lines 104, 106, 108, 110. As the number of provided scan planes increases, the performance increases, but the mechanical complexity, cost, and processing requirements increase proportionately. A system may have for example only two of the scan lines 104, 106 which would be effective at scanning three sides of an item (i.e. bottom, leading and trailing sides of a six-sided box-shaped item). In another example, the system may have only two scan lines 108, 110 which would be effective at scanning three sides of an item (i.e. bottom side, side facing operator and side facing opposite operator of a six-sided box-shaped item).

Each of the scan lines 104, 106, 108, 110 is preferably projected onto the item such that the scan line projected on the item is perpendicular to the direction of travel of the item through the scan plane. Alternately, the scan lines 104, 106 may not only be oriented at a slant angle φ to the horizontal, they may also be tilted. For example, a first line may be oriented at a left slant angle φ to the horizontal (such as scan line 106) and also be tilted directed diagonally up and away from the operator (such as scan line 110). Where the item is a six-sided box, this combined slanted and tilted scan line would project onto the front side of the box (i.e. the side facing the operator), the bottom side of the box, and the trailing side of the box. A second line may be oriented at a right slant angle φ to the horizontal (such as scan line 104) and also be tilted directed diagonally up and toward the operator (such as scan line 108). Where the item is a six-sided box, this second combined slanted and tilted scan line would project onto the back side of the box (i.e. the side facing opposite the operator), the bottom side of the box, and the leading side of the box. In combination, these first and second combined slanted and tilted scan lines would be effective at scanning five sides of an item (i.e., bottom side, trailing side, leading side, side facing operator and side facing opposite operator of a six-sided box-shaped item).

The slot 102 may be disposed in a surface of a scanner housing or platter (e.g., the weigh platter of a scanner-scale) with the operator manually moving the item bearing the optical code past the slot and through the scan plane(s). Alternately, the slot may comprise a gap or other visual opening of a conveyor by which the conveyor transports the item past the slot and through the scan plane(s). In yet another alternate configuration, the slot may be replaced by a window in the horizontal surface that extends over all or some partial extent of the surface.

FIGS. 7-8 illustrate an L-scanner 120 including (a) a lower horizontal section 122 with an elongated slot 124 disposed perpendicular or transverse to the direction of item movement through the scan volume and (b) an upper vertical section 126 with an elongated slot 128 also disposed perpendicular or transverse to the direction of item movement through the scan. volume. The slots 124, 126 are preferably oriented, as illustrated, perpendicular to each other and generally in the same plane. Alternately the slots 124, 126 may be offset and thus not coplanar. The lower section 122 may comprise a weigh platter of an integrated scale, whereby the slot 124 would be disposed within the weigh platter. For purposes of description, the operation will be described with respect to item movement in a right-to-left direction as viewed in the figure, but it will be understood that the scanner may be operated in a left-to-right direction as well. The scanner 120 is provided with four scan line generators each producing a scan line (illustrated as scan planes or read planes) directed through the slots 124/128: (1) a trailing scan line 132 (directed through slot 124 diagonally up and to the left) for reading the trailing left side and the bottom side of an object swept across slot 124; (2) a leading scan line 130 (directed through slot 124 diagonally up and to the right) for reading the leading right side and the bottom side; (3) a front aiming scan line 134 directed through the slot 128 diagonally down and outward toward the operator for scanning the back side (i.e., the side facing opposite the operator) and possibly also the top side; (4) a back aiming scan line 136 directed through slot 124 diagonally up and away from the operator for scanning the front side (i.e. the side facing the operator) and possibly also the bottom side. Alternately, the slot 124 may extend outwardly and cover the lower section 122 to about the lower section front edge.

Alternately or in addition thereto, the leading scan line 130 and/or the trailing scan line 132 may be generated and projected out through the vertical slot 128. Such a configuration would potentially enhance front side coverage but at the expense of bottom side coverage. However, having one of the leading scan lines 130 and trailing scan lines 132 projected out the bottom slot 124 and the other projected out the top slot 128 may produce a good compromise. Desired product performance and internal space considerations would determine the best placement of mechanisms supporting scan lines 130 and 132.

In another alternative embodiment, additional trailing and leading scan lines may be generated and projected out the vertical slot 128 in combination with scan lines 130, 132, 134, 136 to form a total of six scan lines.

This number of scan lines compares to 64 scan lines for the Magellan® 8500 scanner for comparable product coverage. This scan coverage is possible since each scan line of the preferred embodiment is capable of gathering a complete 2-D image, while scan lines in a conventional laser scanner, for example, the Magellan® 8500 scanner, are capable of scanning barcodes whose bars are oriented roughly normal to the scan line direction.

Each of the scan lines may be generated and collected by a separate scan engine. FIGS. 9-10 illustrate a non-retrodirective raster scanning system 150 according to an embodiment that would produce one of the scan lines of FIGS. 6-8. The system 150 includes a light source 155, such as a laser diode, generating a light beam directed to a ditherer 156 (such as a resonant mechanical oscillator or other suitable mechanism). The ditherer 156 scans the light beam over an angle α through a gap 161 in the collection lens 160 and then reflecting off the redirection mirror 158 diagonally upward and through the window 154 and toward the item in the scan volume bearing the barcode. The system 150 implements a non-retrodirective collection mechanism as return light reflecting off the barcode passes through the window 154, off the redirection mirror 158 where it is collected/focused by collection lens 160 toward the detector 162. The scan plane of the scanning mechanism 152 is parallel to the window 154, due to the redirection mirror 158, which permits construction of a very thin scanner. Because of the high scan rate required, the preferred embodiment uses a resonant dithering system to create the scan line. Due to non-retrodirective collection, the moving mirror of the dither mechanism 156 may also be very small, which is advantageous for low power and low noise operation.

As a tradeoff for the simpler and more compact optics configuration, the scan rate of the scan mechanism 152 is preferably high on the order of 10,000 scans/sec. The scan rate would correspond to a facet wheel speed of 150,000 rpm if the scan line were generated by a four-sided spinning facet wheel. This rate is high relative to a conventional facet wheel scanner, which scans on the order of 2,000 to 6,000 rpm. In addition, the dither mechanism may be implemented as a resonant mechanical oscillator and may scan at about 5,000 Hz (cycles per second), providing 2 scans per oscillation of the dither mirror, left to right, followed by right to left.

In embodiments employing scan lines generated from multiple scan engines and thus employing multiple detectors, multiple signals may be simultaneously collected. These signals may be processed by a common processor enabling a partial optical code segment from a scan of one of the scan engines to be combined with another partial optical code segment of a scan from another scan engine, the partial code segments being stitched together or assembled to produce a complete scan of the optical code. Any suitable stitching methods may be employed such as those disclosed in U.S. Pat. No. 5,493,108 hereby incorporated by reference. The systems and methods disclosed herein may also apply add-on code and multiple code reading techniques such as disclosed in U.S. Published Application No. 2004-0004124 hereby incorporated by reference whereby a base code or first code may be read by one of the scan engines and the add-on code or second code may be read by another scan engine.

FIG. 11 illustrates that the resolution of the scanner is dependent in the X axis on the scan rate, product speed, and non-scanning axis spot size, and in the Y axis on the width of the scan line, analog to digital converter sample rate, scan rate, and scanning axis spot size. The elements in FIG. 11 are identified as follows:

$W_{sample}$=LineWidth×ScanRate/SampleRate
$W_{scan}$ and $W_{nonscan}$=laser spot size
$W_{raster}$=ProductSpeed/ScanRate
dX=smaller of $W_{nonscan}$ or $W_{raster}$
dY=smaller of $W_{scan}$ or $W_{sample}$ The spatial corollary to the Nyquist theorem (for the prevention of aliasing) requires that to resolve a barcode element of width dX, the sample spacing must be less than or equal to dX (which corresponds to 2 samples per spatial period). It may be desirable to have slightly better resolution than this amount, to ease the signal processing complexity, hence the oversampling ratio R given in the following equation:

Sample Rate=$L_{scan} \cdot V \cdot R^2 / X^2$ where $L_{scan}$=scan line length
R=oversample ratio
X=minimum element width
V=product speed A typical example of the previous equation sets $L_{scan}$=6 inches, R=1.5, X=7.5 mils, and V=100 inches/second. The required sample rate is thus 24 MHz. The analog bandwidth of such a system is the sample rate divided by 2 times the oversample ratio, 8 MHz in this case.

The present inventor has recognized that an optimum tradeoff occurs when the laser spot size is uniform in the X and Y axis (i.e., a round spot shape) and the raster spacing, $W_{raster}$, (at the maximum expected item speed) and the spatial width due to the sample rate, $W_{sample}$, are on the same order as the laser spot size. At slower item speeds, the raster width will be narrower and the laser spot size will determine the resolution in the X axis. Since many of the scan lines hit the product at a 45° angle, it may be desirable to have the non-scanning axis spot size be about 70% the size of the scanning axis spot size, to compensate for the spot size growth when projected onto the item bearing the barcode.

The raster scanning systems described herein may be implemented with numerous non-retrodirective collection configurations, including numerous variations for the collection lens 160 of FIG. 10. The collection system should collect light reflected off of a target anywhere along the scan line 151, which constitutes a large cone angle α in the horizontal plane, but an axial region in the vertical plane. In a retrodirective system such as in FIG. 1, the collected light would be redirected onto the outgoing beam's axis via the retrodirective nature of the large facet wheel 20. The high speed of the scanning mirror 156 makes the use of retrodirective optics highly difficult and undesirable. One method of collecting signal over a large cone angle is shown in FIG. 12, which illustrates a compound parabolic concentrator (CPC) 172. Technically, the side walls of a CPC 172 are parabolic, i.e., curved, though for ease of illustration, FIG. 12 shows a conical concentrator with straight walls. A detector 174 is optically bonded to the optical plastic concentrator 172. Total internal reflection off of the side walls of concentrator 172 allows the detector 174 to collect light over a cone angle ψ, as shown in FIG. 41. Unfortunately, the concentrator collects light in a rotationally symmetric cone of angle ψ, causing the detector to "see" large areas in space not traversed by the scan line. This rotationally symmetric collection causes the detector to collect ambient light, which reduces the quality of the collected signal, especially where the ambient light consists of modulated sources, such as fluorescent lights. The present inventor has recognized the usefulness of a non-retrodirective collection system that collects light over a cone angle ψ in the (horizontal) scanning axis but only along the plane of the horizontal axis in order to collect only the returned light from the reflection of the scan line off an object.

FIG. 42 shows a perspective view of such a non-rotationally symmetric collection lens 400. A detector 410 (shown in FIGS. 43-44) is optically bonded to the back surface of the lens 400. FIG. 43 shows a simplified ray trace of the lens in the horizontal plane. The action of the lens 400 is similar in principle to the CPC 172 of FIG. 12. The front surface 402/403 of this lens 400 is curved to provide improved refraction of the collected light, which results in a shorter collection lens. This type of collection system is called a Dielectric Totally Internally Reflecting Concentrator (DTIRC). Conventional DTIRCs have been rotationally symmetric. Unlike a conventional DTIRC, the collection lens 400 of FIG. 42 has the DTIRC surface in the (horizontal) scanning plane only. In the vertical plane, the lens has a conventional lens shape of an immersion lens, as shown in FIG. 44. Light rays from the target are focused by the front surface 402/403 to the detector 410. No total internal reflection occurs on the side walls 404, which are kept normal to the detector 410. The front surface curve in the vertical axis is typically designed for collecting light reflecting from a target at the farthest distance from the collection optic to a spot on the center of the detector. Thus, the front surface 402/403 of the collection lens 400 in FIG. 42 is anamorphic, where the lens curvature in the horizontal plane is different from that in the vertical plane. Optics design software may be used to optimize the lens surface shape to maximize the collected energy across the scanning angle α and while minimizing the collection of ambient light off of the scanning plane. The collection lens in FIG. 42 is very compact and efficient, and it yields a high numerical aperture (NA).

Figure 14:
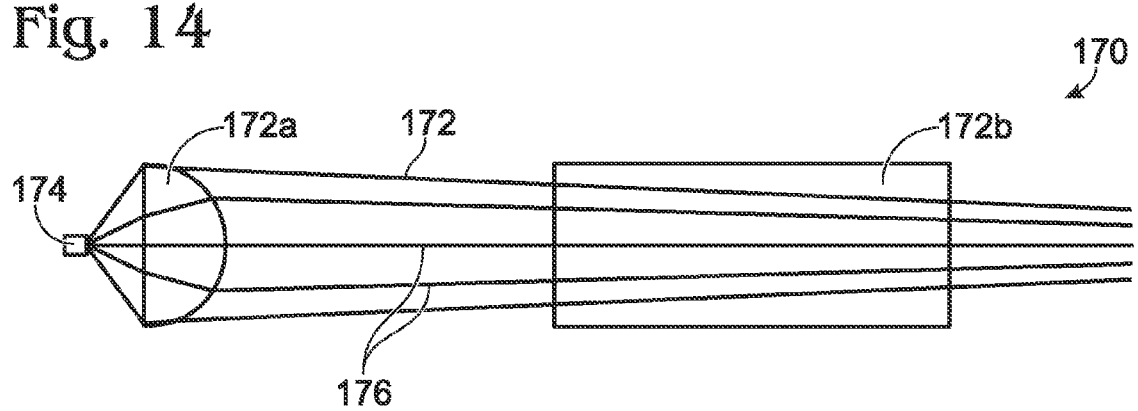
FIG. 14 is a side view of an alternate embodiment collection lens system of FIG. 45.

For improved collection efficiency, where space permits, the two-lens collection system 170 of FIGS. 13,14, and 45 may be used. The front lens 172b is preferably as wide as the scan line width and as tall as the available product height, illustrated in FIG. 9. FIG. 13 shows the focusing action of the front lens 172b. Light reflected off the target from the scanning beam 176 is directed to the front lens 172b. This lens 172b focuses light toward the detector 174. The front lens 172b is cylindrical, having power only in the horizontal axis. The rear lens 172a has a surface curvature generally parallel on its front and back surface to the collection ray bundles 172. Such curvature is similar to a drinking glass. The center of curvature of the front and back surfaces is centered on the detector surface. As such, light rays in the horizontal axis pass through rear lens 172a undeflected. The rear lens 172a has curvature in the vertical axis, however, making it another cylindrical optic. FIG. 14 shows how the collected ray bundles are focused in the vertical axis. The front lens 172b has no front or back curvature in the vertical axis, as it is a cylindrical optic. The front surface of rear lens 172a is curved to concentrate the light bundle 172 onto the detector 174. The back surface of rear lens 172a is flat (plano) for ease of manufacturing. This anamorphic collection lens system provides a uniform collection efficiency across the scan angle α while providing very efficient (high NA) collection. Alternatively, the rear lens 172a may be eliminated and front lens 172b may have curvature in both the horizontal and vertical axis, yielding a collection system of lower optical efficiency, but with fewer parts. Because of the high analog bandwidth of the detection system, due to the high sample rate previously calculated, high collection efficiency is a very important design consideration. The lenses of FIGS. 42 and 45 can be made of appropriate optical materials, such as Acrylic or Polycarbonate, but may also be implemented as diffractive optical components, in a fashion common to those skilled in the art. The large NA of the lenses, however, may make the diffractive implementation of these lenses significantly less efficient than their refractive counterparts.

Table A below compares values of certain parameters of the Magellan® 8500 scanner to a proposed thin raster scanner described above, designed to read 10 mil barcodes up to 100 ips (or equivalently, 5 mil barcodes up to 50 ips in the X axis) with a 6" long scan line, assuming an oversample ratio of 1.5.

TABLE A

| Parameter | Magellan® 8500 scanner | Raster Scanner | Ratio: Raster/Magellan |
|---|---|---|---|
| Number of Scan Lines | 64 | 4 | 1/8 |
| Repetition Rate | 100 Hz | 10 KHz | 100 |
| Scan Lines/Sec | 6,400 | 40,000 | 6.25 |
| Analog Bandwidth | 1.6 MHz | 4.5 MHz | 2.8 |
| Analog Channels | 2 | 4 | 2 |
| Total Bandwidth | 3.2 MHz | 18 MHz | 5.6 |

The raw data captured from a raster scanner according to a preferred embodiment would be 5.6 times the raw data from the Magellan® 8500 scanner. In a preferred embodiment, only a selected subset of this data is processed, corresponding to the chosen virtual scan lines, but in principle, all of this data may be used, if needed, to read the optical code. In addition, all of the raw data from the raster scanner is from an image that is gathered from the moving object so that data may be correlated spatially. In contrast, a conventional laser scanner, as in FIG. 1, can only decode barcodes that are traversed nearly from end to end by the generated scan lines, and requires scan lines that roughly match the possible orientations of a barcode even when employing stitching of scan line segments.

In order to reduce the amount of data that needs to be processed to decode barcodes, a "virtual" scan pattern is generated from the captured image data. In principle, any "virtual" scan pattern may be generated from the raw data captured by the raster scan mechanism. The generated scan pattern should be dense enough in orientation and position to traverse any barcode in any orientation, within the expected barcode size and aspect ratios. Optimally, the virtual scan pattern is dense enough but not more dense than necessary, in order to keep the processing bandwidth to a minimum.

Figure 15:
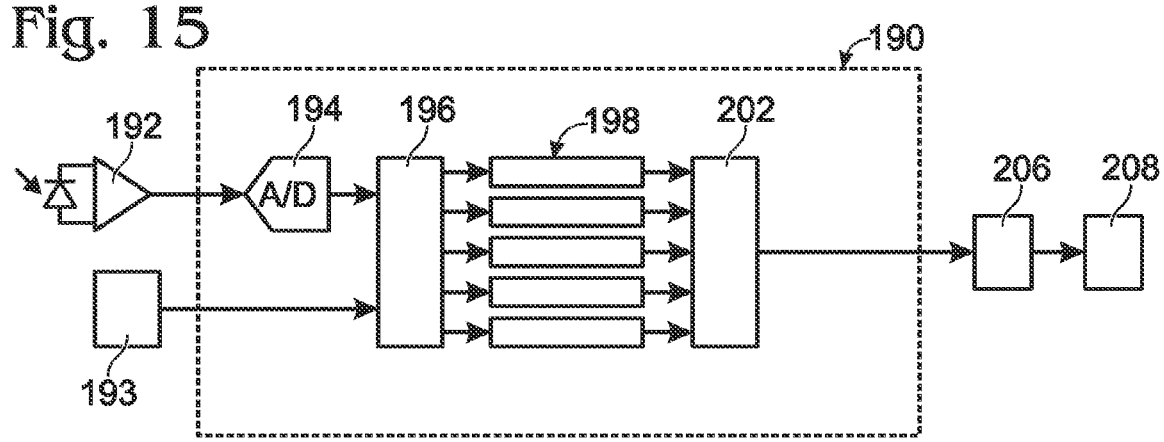
FIG. 15 is a schematic of an electronic scan generator.

FIG. 15 illustrates one embodiment of an electronic scan generator 190. There may be one generator 190 for each analog channel in a scanner such as four channels in the example from Table A. The signal from a detector 191 is pre-amplified by pre-amp 192 and passed to an analog/digital (A/D) converter 194 which digitizes the signals, forming sampled pixels, and then passed to a processor 196. The preamp 192 may further comprise a programmable gain stage and anti-aliasing low pass filter. In a preferred embodiment, the preamp, gain stage, and anti-aliasing filter may be implemented as an analog Application Specific Integrated Circuit (ASIC).

The digital output of the A/D converter represents a full 2-D image as described in FIG. 11. If the full image needed to be processed, it could be stored in a frame buffer at this point. In the preferred embodiment, the processor 196 implements a pixel picker algorithm, which chooses pixels along predetermined virtual scan lines and stores only those pixels in memory. The processor 196 uses the values of counters as pixel coordinates that are incremented by the A/D clock (for the Y axis from FIG. 11) and the high speed ditherer 193 period clock (for the X axis from FIG. 11). The chosen pixels are stored in a scan line buffer 198 for each of these virtual scan lines. The scan line buffer 198 may be a single memory array with the processor 196 choosing the appropriate memory address within the memory array for storing the pixel data. The scan line selector 202 provides a full line of scan data for processing when the selector 202 recognizes that an entire scan line of data has been stored in a given scan line buffer 198. Also, the scan line selector 202 may provide sequential delivery of full scan line data when multiple scan lines from the buffer 198 are available. The data from the scan line selector 202 is processed scan line by scan line using an edge detector 206, which may be a digital edge detector. Element width data from the edge detector 206 is processed by a decoder 208 to yield decoded barcode data. Typically, the raw preamp signal is processed digitally after the analog to digital conversion. Alternately, the edge detector 206 may be implemented in analog hardware instead of digital hardware when required by the processing complexity and speed. This processing could be implemented with a digital to analog converter (DAC) in edge detector block 206 to convert the digitized pixel data to an analog waveform. As the speed and complexity of raster scanning increases, some or all of the components at 196,198, 202, 206 and 208 may be substituted for a processor or by an ASIC.

Figure 16:
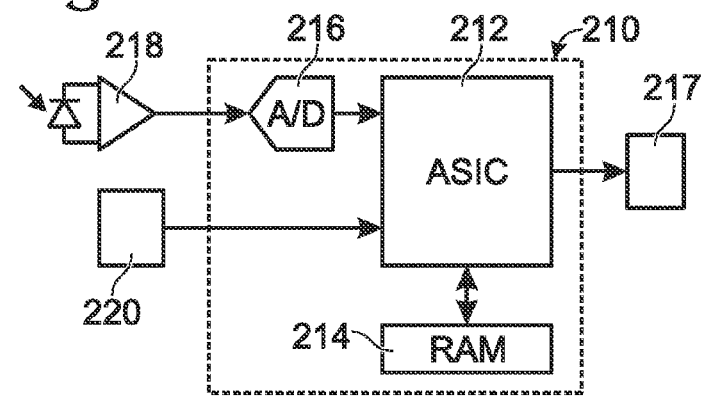
FIG. 16 is a schematic of an alternate electronic scan generator.

FIG. 16 illustrates hardware architecture for an electronic scan pattern generator 210 in which an ASIC 212 contains the electronic scan pattern generation and signal processing functions. The signals from each detector (for example, the four detectors described above) are pre-amplified by pre-amp 218 and passed to an analog/digital converter 216 which digitizes the signals for each "pixel" and then passes them to the ASIC 212 which determines, in communication with the ditherer 220, which "virtual" scan line(s) each of these pixels belongs to. A random access memory (RAM) 214 may be a separate device as shown or may be incorporated into the ASIC 212. The analog to digital (A/D) hardware 216 may also be fully or partially contained within the ASIC 212. Digitized raw analog data is preferably stored in the scan line buffers because a much lower sample rate is required to store raw data versus edge position data, and because multiple rows of raw data would need to be processed to digitize the signal in two dimensions in order to determine edge locations to sub-pixel accuracy that is typically required for barcode decoding. So, in the preferred embodiment, binarizing the raw data (i.e., edge detection) is performed after the virtual scan lines have been assembled. This accumulated data may then be processed by a suitable method such as disclosed in U.S. Pat. Nos. 5,446,271; 5,635,699; or 6,142,376, each of these patents being hereby incorporated by reference.

Figure 17:
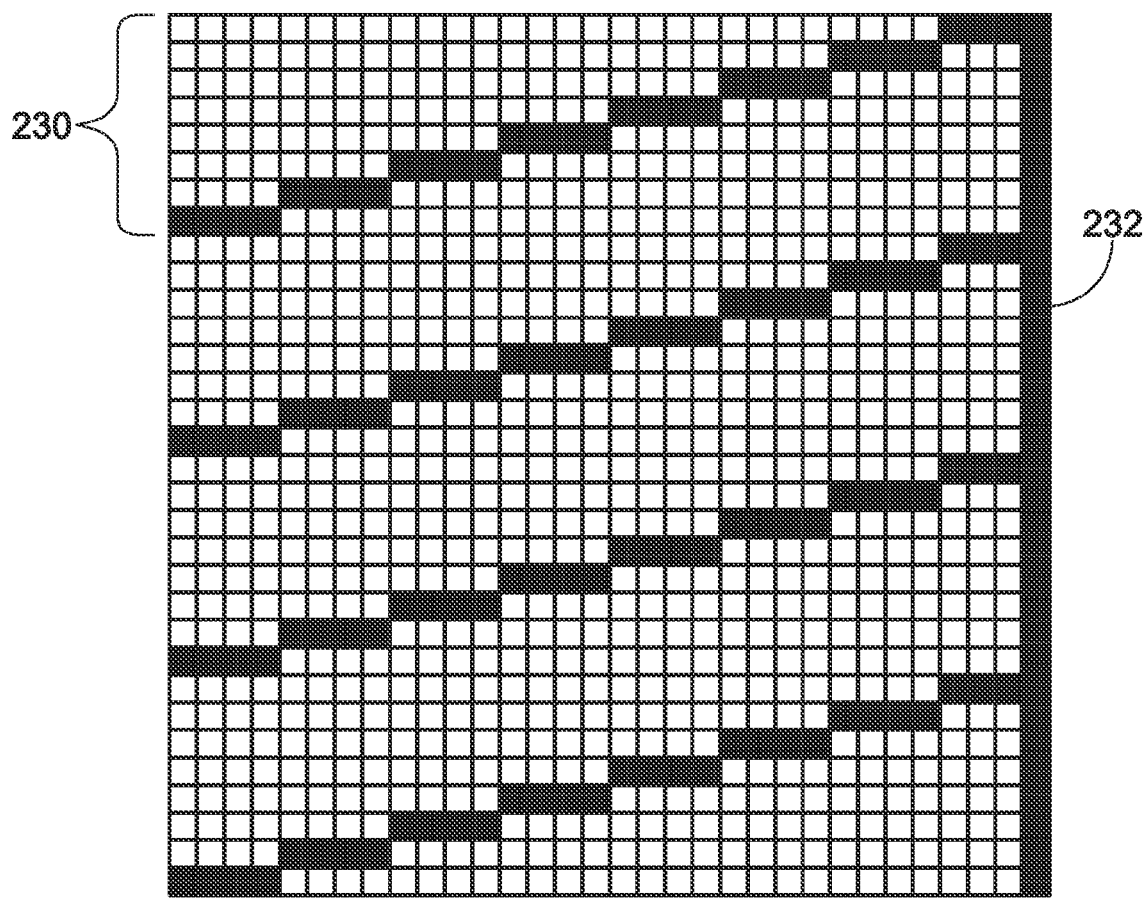
FIG. 17 is a diagram illustrating methods for scan line generation and pixel selection methods.

Effective scan patterns may preferably be generated following a few very simple rules. FIG. 17 diagrammatically illustrates a set of scan lines, shown on the raster scan pattern, viewed as an image, containing pixels (digitized samples of the raw preamp data). The data digitized from the most recent raster scan line of data is depicted as column 232. The columns to the left of column 232 are from previous raster scans of the object. The scan line 230 may be formed by storing a single pixel from each raster line and then advancing the row of the raw data column 232 to store by one pixel every 4 raster columns. To make the entire scan line family, a total of four scan line buffers would be used, with the pixel picking module storing a total of four equally spaced pixels, one into the four scan line buffers, offsetting the starting point every four lines. There are 32 pixels in the scan line column, in this example, and only four pixels are stored, making the output data rate to the edge detector 206 only ⅛ of the A/D sample rate. In an actual system, there may be 1200 pixels/line or more (assuming a 6" scan line with 5 mil resolution and an oversample rate of 1×, and many more scan lines than illustrated in FIG. 17. The reduction in data rate to the edge detector 206 is dependent on the density of the desired scan pattern.

In order to conceptualize the scan pattern generation, a shorthand drawing methodology will be used. Instead of drawing all of the pixels, with dark pixels showing the selected pixels for the scan line, lines are drawn at the appropriate angles to illustrate the orientation of the chosen pixels. The drawings of the pixel patterns look just like conventional laser scan patterns. However, it should be recognized that these lines are composed of pixels, not continuous lines and are virtual not physical. The physical scan pattern in all cases is a single raster line with item motion providing the other dimension to form an image. Since these "lines" are composed of pixels, the pixel resolution must be high enough in order for a label to be read, i.e., to avoid aliasing in the signal. Thus it is possible to draw a scan line in the correct orientation but having too low resolution to read a given label. Examples of low resolution cases will be addressed below. A raster scanner, such as depicted in FIG. 6 or FIG. 8, may have 4 raster lines, thus generating 4 separate raster image views of different sides of the object that is swept past. The scan pattern generators 190 for each raster line may be creating identical scan patterns, or different scan patterns as appropriate to the desired use.

Unlike conventional barcode scanners, the scan pattern of the raster scanner changes with, and indeed is determined by item speed. FIGS. 18-21 illustrate creation of an X-pattern onto an item being passed through the scan field for a raster scanner where the scan line is repeated at 10,000 scans/sec. In these figures, the item is being moved through the scan field from left to right. The X patterns are generated by storing one pixel from the digitized raster line 232 for each scan line. The pixel Y coordinate (position along digitized raster line 232) is advanced by 1 in either the positive or negative direction to create each line in the X pattern.

Figure 18:
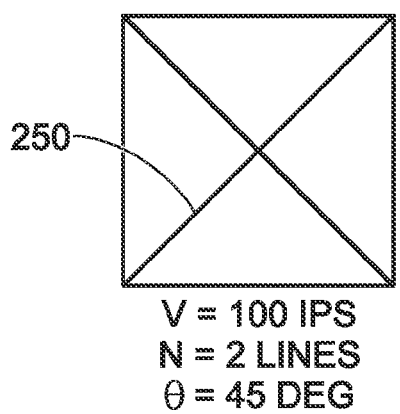

FIG. 18 shows the scan pattern of two scan lines (N=2) that advance by 1 pixel in the Y direction for each new captured raster column 232. The vertical physical extent of the scan line 232, the scan rate, and item velocity (V=100 ips) are such that the captured scan lines form an X pattern 250 at an angle θ=45° to the vertical. When each scan line 250 is completed, that is the Y coordinate hits the end of the raster line 232, a new scan line is generated in a similar fashion.

Figure 19:
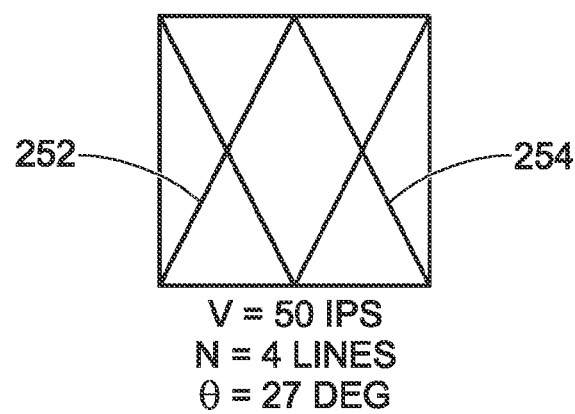

For a product being passed through the scan field at 50 ips (V=50 ips) as shown in FIG. 19, the X pattern 250 becomes compressed by a factor of 2 in the X axis. In the same time period as FIG. 18, the X pattern may repeat twice, yielding four lines (N=4) denoted 252 and 254. While the angle of the scan lines in the captured image remains at 45°, the slower item motion results in the angle of the X pattern if projected on the item becoming θ=27° to the vertical.

For a product being passed through the scan field at 25 ips (V=25 ips) as shown in FIG. 20, the X becomes compressed by a factor of 4 in the X axis. In the same time period, eight lines (N=8) forming four X patterns 256, 258, 260, 262 are projected on the item, the scan lines being at an angle θ=14° to the vertical.

For a product being passed through the scan field at 12.5 ips (V=12.5 ips) as shown in FIG. 21, the X becomes compressed by a factor of 8 in the X axis. Sixteen lines (N=16) forming eight X patterns 264, 266, 268, 270, 272, 274, 276, 278 are projected on the item, the scan lines being at an angle θ=7° to the vertical. In order for the raster scanner concept to function efficiently, the item bearing the barcode has to be moved through the scan field at a given minimum velocity. A practical implementation can be achieved for item speeds as slow as one inch per second, but in any event, it is noted that in the typical scanner environment, the operator is moving the item through the scan field at various speeds. Thus the scanner does not know how fast the item is moving so the system must be able to handle various possible item speeds.

As illustrated in FIGS. 18-21, at lower speeds, the compression of the scan lines in the direction of product motion distorts the scan pattern. Conversely, at high speeds, such as speeds higher than 100 ips in FIGS. 18-21, the resolution may be too poor to read 10 mil labels, since the spacing between the scanned columns 232 becomes farther apart. In addition, the X pattern would become stretched out in a direction perpendicular to the direction of item movement. So the maximum product speed is limited by the scan line repetition rate, to provide sufficient resolution. The scan pattern designed for the maximum product speed should include scan lines of appropriate orientations and offsets to sufficiently cover the scanning region. This coverage is accomplished by pixel assignment module 196 selecting the appropriate pixels out of the digitized raster line by appropriate advancement of the pixel Y coordinate with successive columns of digitized raster lines 232.

Two preferred methods are described for generating an X pattern of shallower angles at the slower product speeds. In the first method, it is considered that an X pattern is desired at half of the maximum product speed. The pixel Y coordinate may be incremented every other raster line, yielding a scan line with twice as many pixels as the X pattern's scan line designed for maximum product speed. This method is wasteful of memory and processing bandwidth, as the data would be spatially oversampled by a factor of 2 over the maximum product speed case. The preferred method of generating an X pattern of shallower angles at slower product speeds, is to design the pixel assignment module to skip scan lines when gathering pixels to store as virtual scan lines. For example, to make an X pattern with a θ=45° at 50 ips item speed instead of 100 ips, a pixel is stored from every other scan line and the position incremented every other scan line. The resultant scan line has ½ the output data rate (into the edge detector 206) as the X scan pattern at 100 ips. In this fashion, extra scan lines are generated at ½ speed multiples of one another to produce X scan lines on items passing at these slower item speeds.

If eight complete sets of scan lines are created at 1, ½, ¼, ⅛, 1/16, 1/32, 1/64, 1/128 the scan line rate, the same "shape" scan pattern will be available over a 128:1 range of label speeds, such as from 0.8 ips to 100 ips. The required edge detection and decoding data rate to process this family of scan lines is only two times the amount needed to handle the high speed scan line by itself, since 1+½+¼+⅛+1/16+1/32+1/64+1/128 is approximately 2. The processing savings and memory savings over making longer scan lines with slower pixel Y coordinate increment rates at the full raster rate are very significant.

FIGS. 22-25 illustrate the effect of this slower speed X pattern generation. The scan patterns illustrated in FIGS. 22-25 include the "fast" scan patterns of FIGS. 18-21, but also include the additional X pattern at the ½ speed multiples thereby providing a more omnidirectional pattern on items that are passing through the scan field at slower speeds. In contrast with a conventional fixed scanner whose scan pattern is constant for all product speeds, the scan line density for this raster scanner increases as the item is moved more slowly through the scan field. Thus for the same number of scan lines per second, the raster scanner has a far better scan pattern, because of the extra orientations of scan lines present at slower scan speeds.

Referring specifically to FIG. 22, for an item being passed through the scan field at a speed V=100 ips (full speed), a single X pattern 250 of two scan lines (N=2) is projected on the item, the scan lines being at an angle θ=45° to the vertical.

Referring specifically to FIG. 23, at a speed of V=50 ips (½ speed), the X pattern becomes compressed by a factor of 2 in the x-axis. Four lines forming two X patterns 252, 254 (also shown in FIG. 19) are projected on the item, the scan lines being at an angle θ=27° to the vertical; and an additional X pattern 280 whose scan lines are at an angle θ=45° to the vertical is projected on the item. The scan pattern is generated by storing pixels from every other raster line. Thus a total of six scan lines (N=6) are generated.

Referring to FIG. 24, at a speed of V=25 ips (¼ speed), the X pattern becomes compressed by a factor of 4 in the x-axis. Eight lines forming four X patterns 256, 258, 260, 262 (also shown in FIG. 20) are projected on the item, the scan lines being at an angle θ=14° to the vertical; the X pattern 280 (from FIG. 23) becomes compressed by a factor of 2 in the x-axis with four lines forming two X patterns 280a, 280b (at an angle θ=27° to vertical) projected on the item; and an additional X pattern 282 whose scan lines are at an angle θ=45° to the vertical is projected on the item. Thus a total of 14 scan lines (N=14) are generated.

Referring to FIG. 25, at a speed of V=12.5 ips (⅛ speed), the X pattern becomes compressed by a factor of 8 in the X axis. Sixteen lines forming eight X patterns (for the element numerals see FIG. 21, patterns 264-278) are projected on the item, the scan lines being at an angle θ=7° to the vertical. The X patterns 280a, 280b (from FIG. 24) become compressed by a factor of 2 in the x-axis with eight lines forming four X patterns 280*a*, 280*b*, 280*c*, 280*d* at an angle θ=14° to vertical projected on the item. The X pattern 282 (from FIG. 24) becomes compressed by a factor of 2 in the x-axis with four lines forming two X patterns 282*a*, 282*b* at an angle θ=27° to vertical projected on the item; and an additional X pattern 284 whose scan lines are at an angle θ=45° to the vertical is projected on the item. Thus a total of 30 scan lines (N=30) are generated.

Additional scan line sets may be produced for each of the other ½ speed multiples (1/16 speed, 1/32, 1/64, 1/128) in similar fashion providing enhanced item coverage at these lower item speeds.

Though a highly omnidirectional pattern at 12.5 ips is illustrated in FIG. 25, only a single X pattern 250 at 100 ips is illustrated in FIG. 22. Thus it may be desirable to enhance omnidirectionality at high speeds by adding extra scan lines at such speeds. For example, a pair of 27° lines may be added to the 100 ips pattern (only), which will replicate itself at 50 ips as 14°, and 7° at 25 ips, and so on. Another pair of lines at 140 for the 100 ips pattern may also be added, if desired. Each pair of lines added at 100 ips adds heavily to the processing burden, since it is running at the maximum speed, thus it may be preferred to not make the highest speed as omnidirectional, for the sake of processing efficiency. Furthermore, the benefit of these lines at slower product speeds is reduced compared to those of the X patterns previously described, as the shortening of the scan lines with increased speed makes them less likely to traverse the entire barcode.

Figure 26:
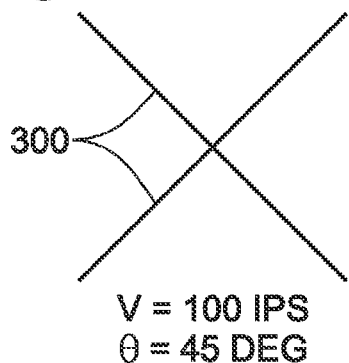
FIGS. 26-29 are diagrams of scan patterns illustrating scan line gaps.
Figure 27:
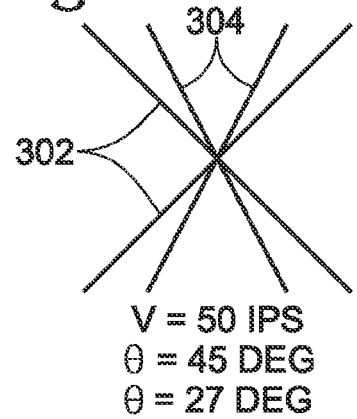
Figure 28:
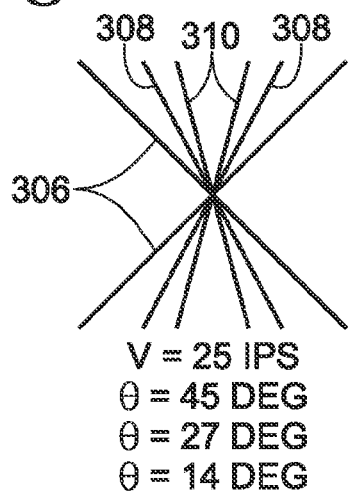
Figure 29:
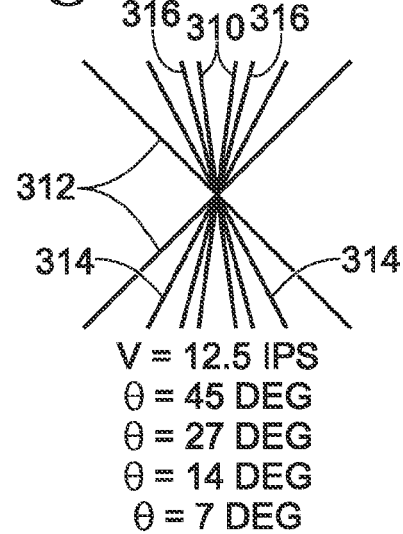

Insight into the behavior of the scan pattern at various speeds can be seen with the aid of FIGS. 26-29. Using the same scan pattern generation method used in FIGS. 22-25, the orientations of the scan lines are shown centered around a common axis (left to right positions of the scan lines are shifted to hit a common center). FIG. 26 shows the scan pattern at 100 ips, showing the single X pattern 300. FIG. 27 shows the compressed X pattern 304 of FIG. 26, along with the X pattern generated 302 at ½ speed. Two sets of scan angles make up the scan pattern: ±45° and ±27°. FIGS. 28 and 29 show the scan line orientations at slower product speeds, with FIG. 29 showing 4 different scan angles. A deficiency of scan angles can be seen between 45° and 90°.

Figure 30:
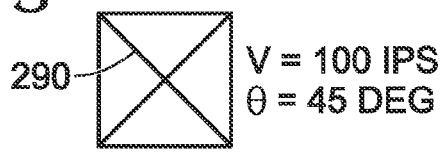
FIGS. 30-32 are diagrams of scan patterns for filling scan line gaps.
Figure 31:
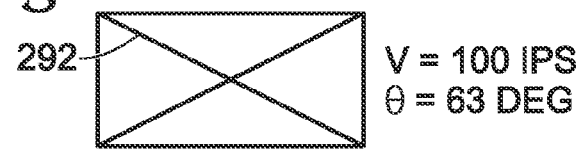
Figure 32:
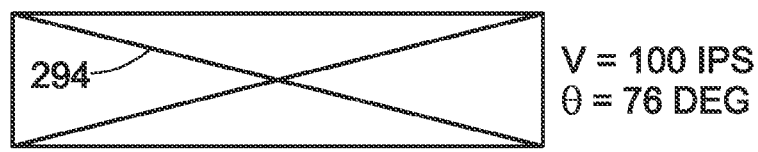
Figure 33:
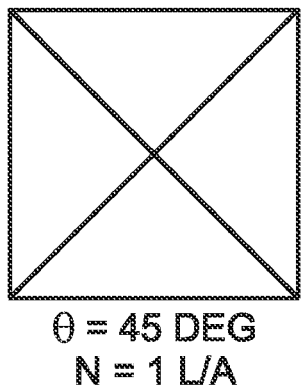
FIGS. 33-36 are diagrams of dense scan patterns representing different spatial densities of virtual scan patterns.
Figure 34:
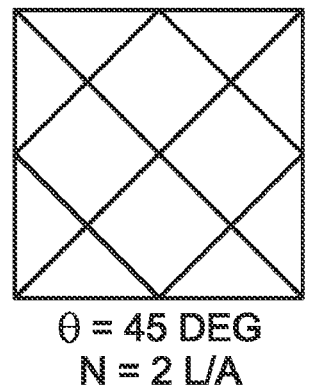
Figure 35:
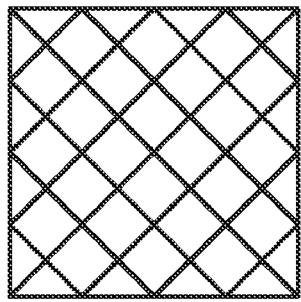
Figure 36:
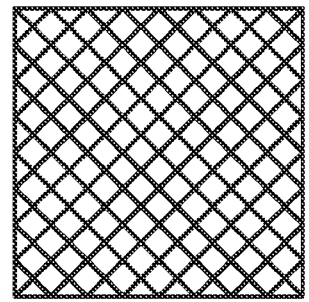

FIGS. 30-32 illustrate additional scan lines that may be created to fill these gaps. These additional scan lines are created by a slower intra-scan line (pixel Y coordinate) advance rate than 1 per pixel. For example, in the 100 ips pattern, a pixel from two successive scan lines is taken at the same scan line "coordinate" before advancing to the next pixel position along the scan line. This advance rate may be referred to as a ½ pixel/line advance rate as opposed to the 45° scan line pair 290 shown in FIG. 30, which has a 1 pixel/line advance rate. This ½ advance rate creates a scan line pair 292 at 63° as illustrated in FIG. 31. Though this type of scan pattern requires a scan line buffer that is 2× the length of a 45° pattern, the data processing rate is the same as the X pattern at 100 ips. Similarly, using a ¼ pixel/line advance rate yields a scan line pair 294 at 76° (as illustrated in FIG. 32) requiring a 4× depth scan line buffer. The data processing rate for the 76° pattern is the same as for the 45° pattern. If scan lines of these orientations are desired at slower scan speeds, they can be generated by skipping raster lines as previously described for the X patterns, with the attendant processing rate reduction. However, the memory requirements for these lines are similar to the maximum speed case, requiring more memory than the X patterns.

Figure 46:
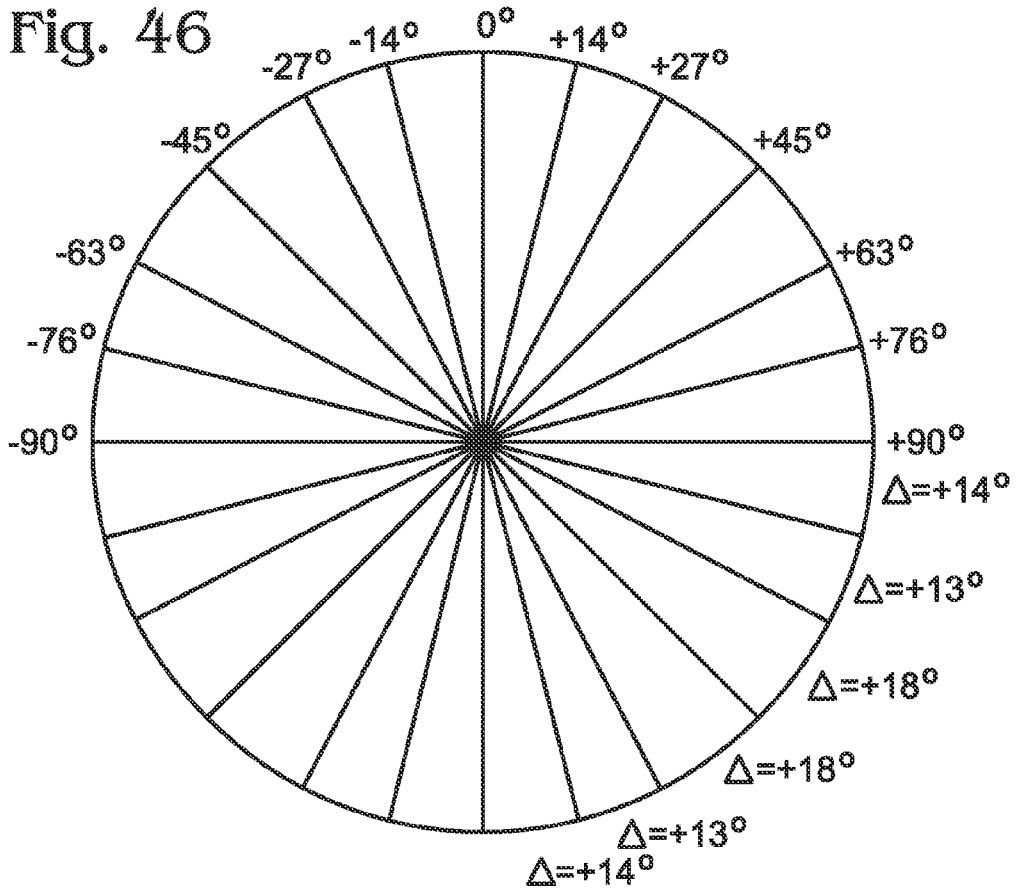
FIG. 46 is a representation of the angular orientation of the virtual scan lines according to one embodiment.

Table B below summarizes the scan angles available with simple pixel assignment module algorithms. The X increment rate describes whether a pixel is taken every raster scan line or if raster scan lines are skipped. A rate of 1 means that a pixel is stored from every raster line. A rate of ½ means that two pixels would be stored from a given raster line. As these scan patterns are replicated at slower speeds, the X increment rate is scaled appropriately. The Y increment rate describes at what rate the Y coordinate within the raster scan line is incremented. Table B shows just 7 types of scan lines, each being formed by simple pixel address computation. FIG. 46 illustrates graphically the scan lines created from this table. Also shown is the angular spacing Δ between scan lines. An inter-line angular spacing between 13° to 18° results. The angular spacing is quite small compared to the scan pattern of the Magellan® 8500 scanner, which has about a 30° angle spacing across its pattern. The smaller this angle, the more truncated the labels may be and yet still be readable. Even denser angular coverage can be yielded using finer X and Y increment rates, made possible by use of the Bresenham line drawing algorithm, for example.

TABLE B

| Y Increment Rate (Pixel/Line) | X Increment Rate (Lines/Pixel) | Scan Angle |
|---|---|---|
| 0 | 1 | 90° |
| ±¼ | 1 | ±76° |
| ±½ | 1 | ±63° |
| ±1 | 1 | ±45° |
| ±1 | ½ | ±27° |
| ±1 | ¼ | ±14° |
| 1 | 0 | 0° |

In addition to having enough rotational coverage of the scan pattern, the pattern may require spatial coverage. Multiple parallel scan lines may be generated by offsetting the starting pixel by a constant amount from the previous scan line. FIGS. 33-36 illustrates a set of increasingly dense scan patterns created by this method. The combination of this increased density method with the previous method of generating different scan angles produces a dense omnidirectional pattern. Increasing the number of parallel scan lines at a given angle directly increases the processing load. The label N in the drawings indicates the number of parallel scan lines at a given scan angle.

To implement these scan pattern types, a preferred configuration for the pixel picking module 196 implemented in a processor may include:

Two raster line memories where the digitized pixel data from the A/D converter 194 for a single raster line is stored, wherein one memory is used to store the incoming raster line, while the other memory is used to retrieve chosen pixels from the previously stored line, whereby the memories alternate in function on each raster line in a manner known in the art as double buffering;

A scan line memory 198 with sufficient size that is capable of storing all of the chosen pixels for all of the scan lines in a given scan pattern;

A list of data representing the desired scan pattern including, but not limited to, for each scan line the starting X pixel coordinate where the scan line starts (to account for the repetition of this line over time), the starting Y pixel coordinate on the first raster column of data and the increment rate to determine the angle of the scan line, and a total number of pixels to store (describing the length of the line);

A set of values that keep track of the next pixel that is to be stored for each scan line;

A software program that includes, but is not limited to, for each new raster line stored in the raster line memory, through all of the scan lines, choosing pixels at the designated coordinates, storing the chosen pixels in the appropriate scan pattern memory and incrementing the designated coordinates by the increment rate.

A very flexible and efficient algorithm for implementing the pixel addressing is the Bresenham line drawing algorithm, for it uses integer arithmetic to calculate pixel coordinates of lines with arbitrary start and end coordinates. Implementation of the pixel picking module 196 in hardware may be implemented in a significantly different manner. A hardware implementation would typically be invoked when the required speed of the block is too high for a reasonable implementation on a processor. Restrictions on the scan angles, such as shown in Table B may allow the hardware implementation to be significantly less complex. Use of logical operations on pixel X and Y addresses may allow the digitized data from the A/D converter 194 to be stored into the scan line memory 198 without the need for a pair of scan line buffers or sequential storing logic.

Following is an example of a preferred embodiment of the raster scanner. Typically, the scanner raster contains four raster mechanisms, such as in FIG. 8. Each dithering device 156 (FIG. 9) is operating at 5 KHz or 10,000 scans/sec. For an object moving past the scanner at 100 inches/sec, the spacing between raster lines is about 10 mils. At an object speed of 60 inches/sec, the spacing between raster lines is about 6 mils. The scan lines are each 6 inches long as they approach the associated window of the scanner. This scan line length is achieved by obtaining a suitable distance inside the scanning enclosure between the window and the dithering device 156. If the dithering device deflection angle $\alpha$ were to be about 28°, the dithering device would need to be 12" behind the window in order to project a 6" wide scan line at the window. The use of mirrors, such as redirection mirror 158 allows the 12" path length to be taken up in a small physical space, with additional mirrors if necessary. By sampling at 1000 samples per scan line or 10 MHz there is a sample resolution of 6 mils. In order to match the performance of a conventional laser scanner, for example the Magellan® 8500, the scan pattern from each raster line may contain three sets of scan angles: 14°, 45°, and 76° with +/− orientations, totaling 6 orientations spaced about 30° apart.

There are four parallel lines at each scan angle providing 24 virtual scan lines that are formed from each of the four raster line generated by the preferred scanner that is described herein. Therefore, a total of 96 virtual scan lines are generated by the scanner to read products sweeping at the maximum designed speed of 100 inches/second.

To cover varying item speeds, additional slower data rate virtual scan lines are generated at $\frac{1}{2}$, $\frac{1}{4}$, $\frac{1}{8}$, $\frac{1}{16}$, $\frac{1}{32}$, $\frac{1}{64}$ and $\frac{1}{128}$ the raster line rate. The raster line rate provides eight times the total number of scan lines or 768 scan lines. The data rate to the edge detectors is 2× the data rate of the original 96 scan lines because of the reduced data rate of the additional scan lines (the sum of $1+\frac{1}{2}+\frac{1}{4}+\frac{1}{8}+\frac{1}{16}+\frac{1}{32}+\frac{1}{64}+\frac{1}{128}$ is approximately 2). The slowest sweep speed that will have a full omnidirectional pattern is 100 ips divided by 128, which is approximately 0.8 ips. The number of samples in each of the 14° and 45° scan lines is 1000 samples, which is the same as the digitized width of the raster line. The number of samples in the 76° scan lines is 2000 samples as shown in FIG. 32. The total number of stored samples for the whole scanner may be calculated by (4 sources)×(4 parallel lines)×(2 orientations)×(1000 samples/14°+1000 samples/45°+2000 samples/76°)×8 speeds which is equal to about 1 million samples. If two bytes are stored per sample, then the 1 million samples are 2 Mb of memory. Consequently, dynamic random access memory or DRAM is appropriate as the data is refreshed constantly at a rapid rate. Furthermore, the average number of pixels that are chosen from each raster line is 48 out of a possible 1000 pixels or about 5%, since there are (4 parallel lines)×(2 orientations)×(3 angles)×(1+ $\frac{1}{2}+\frac{1}{4}+\frac{1}{8}+\frac{1}{16}+\frac{1}{32}+\frac{1}{64}+\frac{1}{128}$) pixels chosen per virtual scan line per raster line). While the sample rate of each raster line is 10 MHz, the pixel rate of data going into the virtual scan line memories and to the edge detector is 480 KHz. Considering the four raster lines that make up the scanner, then about 2 million pixels/second may be processed by the edge detector. This processing speed corresponds to an equivalent analog bandwidth of 1 MHz when there is analog based edge detection. For a facet wheel type barcode scanner such as the Magellan® 8500, the analog edge detection bandwidth is 1.6 MHz per channel, or 3.2 MHz total. So the raster scanner can provide a much denser scan pattern while using less than ⅓ of the edge detection and decoding bandwidth.

As shown in FIGS. 22-25, the scan pattern becomes denser at slower sweep speeds, which improves the ability to read truncated labels over a scanner such as the Magellan® 8500. The scan pattern of the described raster scanner provides a fairly constant 30° spacing at the fastest speed. At slower speeds, the angular coverage becomes increasingly more dense and the spacing of lines closer together in the direction of travel. While the spacing effect happens on a facet wheel scanner, there is no angular coverage effect for the facet wheel scanner, yielding improved performance with the raster scanner.

As processing power and memory permit, the virtual scan patterns generated from the incoming raster lines can be as dense as desired. While the preferred embodiment employs a virtual scan pattern mechanism, those skilled in the art realize that up to the output of the A/D converter 194, the described scanning mechanism (of FIG. 8, for example) is capable of capturing multiple 2-D images of a scanned object. Images of objects other than and including barcodes may be captured in a suitable frame buffer memory to allow more sophisticated image processing than the virtual scan line technique allows.

The design of the A/D converter may be an important factor to cost effectiveness of a raster scanner design. The raw data coming from the pre-amp will require probably 12 bits of resolution. The bandwidth in the example on Table A requires an analog bandwidth of 4.5 MHz and a sample rate of 13.5 million samples per second (MSPS) for the A/D converter, at an assumed oversampling ratio of 1.5. With clever design, the A/D for this application may be simplified. The global dynamic range is wide, but the dynamic range of the barcode itself is quite low, perhaps only 6 bits. If a ranging converter were used (gear shift/gain control concept) then a slow, coarse A/D can select the gain and a fast, coarse A/D can digitize the barcode data itself. The full 12 bit data would be recorded inside the ASIC. Much of the A/D functionality may reside inside the ASIC itself, such as for example in the form of a modified sigma-delta converter, lowering cost further by utilizing the silicon already purchased for the ASIC.

The raster scanner relies on item motion to generate the scan pattern. If an item does not scan and the user holds the label stationary in front of the scanner, the raster scanner cannot read a label unless the barcode is oriented such that a raster scan line (or a plurality of raster scan lines if stitching is employed) traverses the entire barcode. It may be advantageous to augment the sweep operation of the raster scanner with a mechanism that can read barcodes when there is little or no movement of the code. This mechanism need only read barcodes moving up to less than 1 inch per second. Many technologies are suitable for this purpose, including 2-D solid state imaging devices using charge coupled device (CCD) or CMOS sensors.

Figure 37:
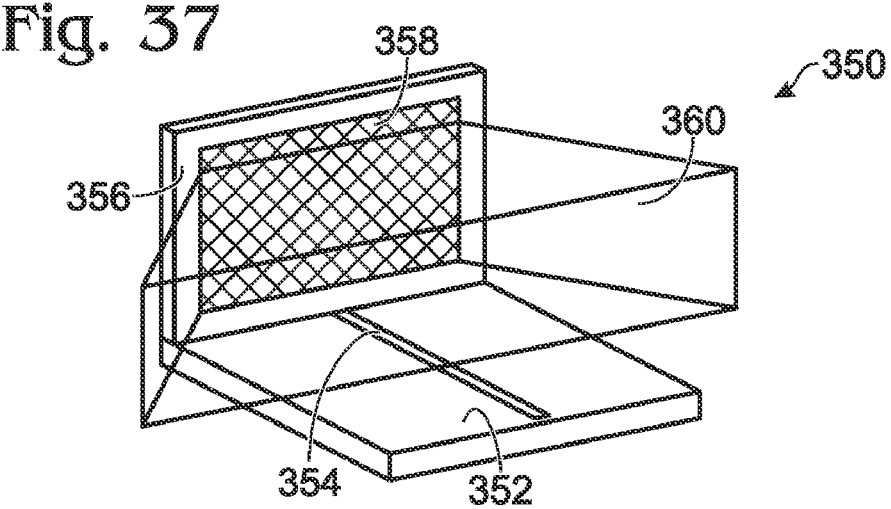
FIG. 37 is a schematic diagram of a raster scanner with two axis rastering on one scan window.

FIGS. 37-38 illustrate an alternate raster scanner 350 having an L-shape configuration with a lower horizontal section 352 and an upper vertical section 356. The lower section 352 includes a narrow slot horizontal window 354, behind which is one or more raster scan mechanisms 152 of FIG. 9, but the upper section includes a large rectangular vertical window 358. Since items are not dragged across the vertical window 358, its material may comprise standard glass (rather than the more expensive sapphire or other scratch-resistant surface of the horizontal window 354). Vertical window 358 contains a 2-D imaging device and may also include one or more raster scan mechanisms 152 as illustrated in FIG. 9. This design optimizes the ability to read stationary barcodes (through the vertical window) or swept barcodes (from any orientation). Cost is minimized by reducing the size of the horizontal window 354, which needs to be made of expensive scratch resistant material. A scanner similar to FIG. 37 may be made employing a 2-D imaging device in both the horizontal and vertical windows, in addition to one or more raster scan mechanisms 152.

The 2-D imaging device depicted in FIG. 37 may be implemented with a form of a raster scanning device. FIG. 38 shows one example how the raster scan mechanism 152 can be modified to provide reading of swept as well as non-moving objects. The redirection mirror 158 of FIG. 9 is replaced by a scanning mirror 366. Components 362, 364, and 368 are equivalent to those 156, 161, and 162 of FIG. 9. Mirror 366 is deflected back and forth, illustrated by pivot 367. This deflection mechanism could be implemented with a motor, a dithering system, or whatever mechanics are appropriate for the space, size, and cost of the application. The raster line is emitted out a larger window 358 at various angles as directed by mirror 366. The mirror 366 is deflected at a slow rate to provide numerous scan lines per oscillation period. The traversing of the scan line from, say, left to right or right to left is called a frame. Ideally this time is an integral multiple of the raster scan period. For example, in a preferred embodiment system where the raster scan line rate is 10,000 lines per second and 1000 pixels are digitized per raster scan line, a frame rate of 10 frames per second will allow 1000 rows to be digitized per frame, yielding an image of 1000×1000 pixels. The mirror 366 will oscillate back and forth at a rate of 5 cycles per second (5 Hz). A stationary object is thus imaged in 2 dimensions by the Y dimension action of the raster scan mechanism and the X dimension action of the deflection mirror 366. The deflection mirror 366 provides a retrodirective collection path in the X dimension to detector 368. Thus the mirror size needs to be large—but since the deflection speed is so small, there is little penalty for this design choice. An exemplary drive mechanism for deflection mirror 366 is a linear motor. Such designs are popular in the design of disk drive seek heads. These designs provide efficient torque in a small, low cost package. The use of a moving magnet and fixed coil allows the use of a stationary hall sensor within the coil to sense the magnet (and thus deflection mirror 366 position) at low cost. This configuration is readily suitable for both fixed and handheld systems.

Since the raster scanner captures a 2-D raster image from multiple planes, it is quite possible to read PDF-417 and true 2-D barcodes, such as Maxi-Code. The data may be stored as a rolling 2-D image and processed with techniques common for 2-D imaging scanners. Though the processing burden would be significant at fixed scanner speeds, a presentation scanner or slow sweep scanner would be quite feasible by sub-sampling the scan lines.

The raster scanner concept naturally lends itself to single line solid state imaging techniques. The use of imaging in a fixed scanner has been problematic because of getting enough light on the target and achieving enough depth of field. These problems are managed with this concept because when non-ambient illumination is desired, such illumination is only necessary along a few (typically or for example 4) scan lines or read planes, instead of requiring a 2-D field to be illuminated. The imaging mechanism 370 of FIG. 39 replaces the laser scanning mechanism of FIG. 9. A linear imager 372 may be used in conjunction with an imaging lens 384 to image the target 388 along a read plane within the read volume over a desired depth of field. The fold minor 378 serves the same purpose as beam redirection minor 158, folding the optics into a thin package. The field angle of the linear imaging system may preferably be similar to that of the laser scanning mechanism of FIG. 9, namely about 28°, which simplifies the correction of off axis optical aberrations, such as coma.

The light source 374 may be a set of light emitting diodes (LEDs), providing a bright narrow strip of illumination over the desired depth of field thus projecting an illumination plane into the read volume. The read plane projects into the read volume generally transverse to the item direction and generally coplanar with the illumination plane. In the case of LED illumination, where the height of the illumination region is large with respect to the desired resolution of the system, a linear imager 372 with square pixels is desired, so the resolution is uniform in the X and Y axes at the maximum sweep speed. To provide similar performance as the laser scanning mechanism, the imaging mechanism 370 preferably is run at 10,000 scans per second. This speed corresponds to an exposure time of 100 µs. The short exposure time, combined with the large depth of field requirement (typically 9 inches) and available illumination intensity may put severe restrictions on the lens/imager system. The preferred embodiment uses low noise linear CCDs or linear CMOS sensors. The lens system described in U.S. patent application Ser. No. 11/045,213, U.S. Pat. No. 7,215,493, hereby incorporated by reference, provides improved optical efficiency that may be beneficial in this embodiment.

Figure 47:
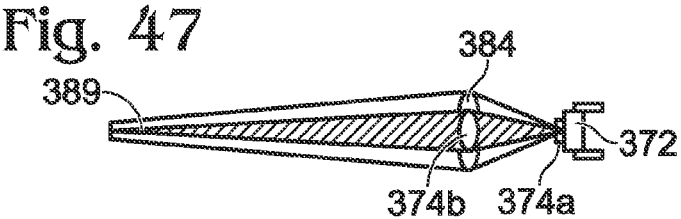
FIG. 47 is a side view of a linear imaging system according to one embodiment.
Figure 48:
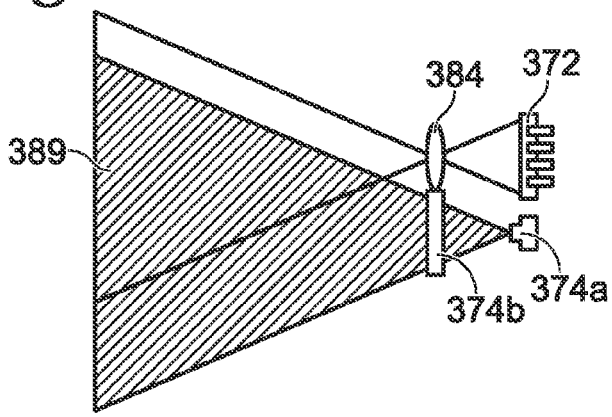
FIG. 48 is a top view of the linear imaging system of FIG. 47.

Alternatively, the light source 374 may be a visible laser diode 374*a* and lens 374*b* as shown in side view in FIG. 47. The lens 374*b* focuses the laser diode light onto the barcode target at a position along a mutual optical axis of the imaging system at 389. The pixels of linear imager 372 are rectangular in shape, in order to collect light from a region including and slightly surrounding the laser beam in order to maximize collection efficiency. FIG. 48 shows a top view of the assembly. The lens 374*b* is preferably cylindrical, with little or no optical power in this top view. Typical laser diodes have a large amount of astigmatism, yielding an emission cone that is very large in one axis, which coincides with the top view in this figure. The lens 374*b* focuses the narrow axis of the laser diode in order to make a projected laser line. This laser line generator coincides with the field of view of the linear imager 372.

Figure 49:
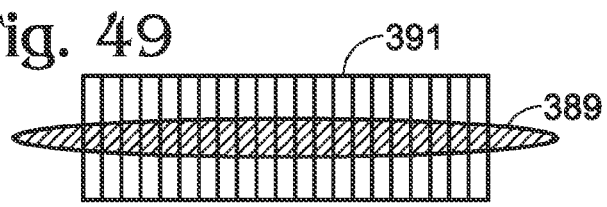
FIG. 49 is a barcode target view of the imaging pixels and laser line of the linear imaging system of FIG. 47.

The action of the image sensing region of the pixels 391 of linear imager 372 is illustrated in FIG. 49. The laser line source 389 hits the barcode target. Pixels 391 of the linear imager 372 collect all of the energy of the laser beam and divides it spatially by pixels. The position tolerance of the laser line 389 is manufacturable, because of the large collection area afforded by the rectangular pixels 390 of the linear imager 372. In this system, the thickness of the laser line source provides the imaging resolution in the movement axis of the mechanism (termed the X axis in previous figures), while the pixel width 391 determines the resolution in the so-called scanning axis (termed the Y axis in previous figures). So the height of the pixels does not determine the resolution of the system, but provides a means for efficiently collecting the returned laser light. The present inventor has recognized that generation of a laser line source typically creates speckle and beam nonuniformity. These effects may be combated through various means, including use of a laser with a short coherence length (wide bandwidth), by microdithering, or by other suitable techniques.

In the above configurations, the item being read and the data reader are moved relative to each other. As described, in a fixed scanner, the item may be moved in the given item direction through the scan plane. In another configuration, the item may be stationary, such as in a handheld reader configuration, and the handheld reader moved in a direction such as to pass the scan plane(s) past the item.

Further reductions in illumination and increases in depth of field may be achieved by using an optical configuration using the Scheimpflug technique. For example, the scanner 390 illustrated in FIG. 40 uses a 2-D imager 392 as a single line scanner. Each of the other elements in the figure are the same as the embodiment of FIG. 39 and bear the same numbers. The focal plane of the imager 392 is tilted in order to have different rows focus at different target distances. The lens aperture can be larger, since each row needs to cover a smaller depth of field. The aggregate of all of the rows of the imager 392 provides the required depth of field. This larger aperture allows the system to collect more light, enabling lower intensity illumination, such as with LEDs 374. Inexpensive CMOS imagers may be used, since this technique does not require a frame shutter as do other 2-D imaging techniques, since only one row of the imager is used for a given raster scan.

In order to reduce the data rate coming out of the imager, it is preferred to locate which row or rows have data and selectively scan out only that row. The integration and row readout need to happen simultaneously, each occurring in 100 μs for the preferred embodiment. Selecting the row of data that is in best focus may be performed in many ways. If a narrow enough source of illumination is provided, such as by laser line illumination or well focused LED illumination and this illumination is directed along the plane of best focus, the lines in the image with the most illumination are in best focus. This selection of best focus may be quite readily determined by circuitry within the 2-D imager itself. Thus an automatic way for the 2-D imager to provide only the row in best focus is easily obtained. Alternately, the modulation depth of data on different rows of the imager may be compared to determine which row has the most modulation depth (of high frequency data) and thus is in best focus. In either method, the change of row in best focus from scan to scan is likely to be slow as the object is moving slowly compared to the imaging line rate.

While there has been illustrated and described a disclosure with reference to certain embodiments, it will be appreciated that numerous changes and modifications are likely to occur to those skilled in the art. It is intended in the appended claims to cover all those changes and modifications that fall within the spirit and scope of this disclosure and should, therefore, be determined only by the following claims and their equivalents.

What is claimed is:

1. A method of reading optical codes, comprising the steps of
    moving an item containing an optical code along an item direction past a slot, the slot being disposed in a first surface of a scanner housing or platter and the slot being elongated in one direction and oriented generally transverse to the item direction, the slot having a narrow width parallel to the item direction;
    via a first scan mechanism, repeatedly scanning through the slot along a single line to form a first scan plane at a rearward first slant angle to the first surface in a rearward direction to acquire, in combination with movement of the item, a first set of scanned data of a two-dimensional image of at least a leading side of the item;
    via a second scan mechanism, repeatedly scanning through the slot along a single line to form a second scan plane at a forward second slant angle to the first surface in a forward direction to acquire, in combination with movement of the item, a second set of scanned data of a two-dimensional image of at least a trailing side of the item;
    processing the first and second sets of scanned data acquired.

2. A method according to claim 1 wherein the step of processing the sets of scanned data comprises
    storing a selected portion of said first set of scanned data; and
    decoding the selected portion of said first set of scanned data according to a plurality of virtual scan lines.

3. A method according to claim 1 further comprising
    acquiring, in combination, scanned data of two-dimensional images of at least three sides of the item including the leading side, the trailing side, and a side facing the slot.

4. A method according to claim 1 wherein the item comprises a six-sided box-shaped item including a first side comprising the leading side, a second side comprising the trailing side, a third side facing the slot, a fourth side transverse to the slot and proximate an operator position, a fifth side transverse to the slot and opposite the fourth side, and a sixth side opposite the third side, the method further comprising
    the first and second scan mechanisms acquiring, in combination, scanned data of two-dimensional images of at least the first, second and third sides of the item;
    via a third scan mechanism, repeatedly scanning through the slot at a first tilt angle to the surface in a first direction from a first end of the slot and along a single line to acquire, in combination with movement of the item, a third set of scanned data of a two-dimensional image of the fourth side of the item transverse to the slot.

5. A method according to claim 4 further comprising
    via a fourth scan mechanism, repeatedly scanning through the slot at a second tilt angle to the surface in a second direction from a second end of the slot and along a single line to acquire, in combination with movement of the item, a fourth set of scanned data of a two-dimensional image of the fifth side of the item transverse to the slot.

6. A method according to claim 1, wherein the slot comprises a first window, the method further comprising the steps of
    forming the scanner housing with a second surface generally orthogonal to the first surface and with a second window disposed in the second surface;
    repeatedly reading through the second window at a third slant angle and acquiring, in combination with movement of the item, a third set of scan data of a two-dimensional image of at least a side of the item facing the second window as the item is passed by the second window.

7. A method according to claim 6 wherein the step of reading through the second window comprises reading through the second window along the third slant angle at a first tilt angle to the second surface in a direction from one end of the second window toward the first surface for acquiring a field of view of a side of the item facing away from the first surface.

8. A method according to claim 1 wherein the slot comprises a first window, wherein the scanner housing comprises a second surface having a second window disposed therein, the scanner housing comprising an L-shape with one of the first and second surfaces being oriented generally horizontal and the other surface being oriented generally vertical, the method further comprising via a third scan mechanism, repeatedly reading through the second window along a third slant angle to the second surface and along a single line to acquire, in combination with movement of the item, a third set of scanned data of a two-dimensional image of at least a side of the item facing the second window as the item is passed by the second window.

9. A method of reading optical codes, comprising the steps of moving an item containing an optical code along an item direction through a read volume and past a first window, the first window being disposed in a first surface of a reader housing or platter and oriented facing the read volume;

repeatedly reading with a linear or 2D imager off a fold mirror and then through the first window along a first read plane oriented at a rearward first slant angle to the first surface in a rearward direction, and acquiring, in combination with movement of the item, a first set of scan data of a two-dimensional image of at least a leading side of the item as the item is passed through the first read plane;

repeatedly reading with a linear or 2D imager off a fold mirror and then through the first window along a second read plane oriented at a forward second slant angle to the first surface in a forward direction, and acquiring, in combination with movement of the item, a second set of scan data of a two-dimensional image of at least a trailing side of the item as the item is passed through the second read plane;

processing the sets of scan data acquired.

10. A method according to claim 9 further comprising the steps of forming the reader housing with a second surface generally orthogonal to the first surface and with a second window disposed in the second surface;

repeatedly reading through the second window along a third read plane and acquiring, in combination with movement of the item, scan data of a two-dimensional image of at least a side of the item facing the second window as the item is passed through the third read plane.

11. A method according to claim 10 wherein the step of reading through the second window along a third read plane comprises reading through the second window along the third read plane at a first tilt angle to the second surface in a direction from one end of the second window toward the first window for acquiring a field of view of a side of the item facing away from the first surface.

12. A method according to claim 9 wherein the step of moving an item containing an optical code comprises moving the item via manual manipulation by an operator, the method further comprising compensating for variations in speed of the item occasioned by the item being manually moved through the read volume.

13. A method according to claim 9 further comprising forming an illumination plane by directing a plane of light, emitted from a set of light emitting diodes, into the read volume and generally coplanar with the first read plane, and wherein repeatedly reading through the first window along a first read plane comprises reading with a linear or 2D imager.

14. A method of reading optical codes on items being passed through a read volume, comprising the steps of moving an item containing an optical code along an item direction past a first window, the first window being disposed in a generally horizontal first surface of a reader housing or platter and facing the read volume, the first window comprising a slot being elongated in one direction and oriented generally transverse to the item direction, the slot having a narrow width parallel to the item direction, wherein the item comprises a six-sided box-shaped item including a first side comprising the leading side, a second side comprising the trailing side, a third side facing the first window, a fourth side, perpendicular to the first window and parallel to the item direction and proximate an operator position, a fifth side transverse to the first window and opposite the fourth side, and a sixth side opposite the third side;

forming a first read plane transverse to the item direction by repeatedly reading through the first window, wherein the first read plane is formed with a direction of view at a first tilt angle to the first surface in a first direction from a first end of the first window for acquiring a field of view of the fourth side of the item perpendicular to the first window and parallel to the item direction;

acquiring, in combination with movement of the item, a first set of scan data of a two-dimensional image of at least the fourth side of the item as the item is moved through the first read plane; and processing the first set of scan data.

15. A method according to claim 14 wherein the step of processing the scan data comprises storing a selected portion of the first set of scan data; and decoding the selected portion of the scan data according to a plurality of virtual scan lines.

16. A method according to claim 14 further comprising forming a second read plane by repeatedly reading through the first window at a first slant angle to the first surface and acquiring, in combination with movement of the item, a second set of scan data of a two-dimensional image of the trailing side of the item as the item is moved through the second read plane;

forming a third read plane by repeatedly reading through the first window at a second slant angle to the first window and acquiring, in combination with movement of the item, a third set of scan data of a two-dimensional image of the leading side of the item as the item is moved through the third read plane.

17. A method according to claim 14 further comprising collecting return light reflecting off the optical code via a non-retrodirective collection system that uses item motion to generate the two-dimensional image from the first read plane.

18. A method according to claim 17 further comprising acquiring, in combination with movement of the item, scanned data of a two-dimensional image of the third side of the item facing the first window, whereby the method is effective to acquire scanned data of two-dimensional images of five sides of the six-sided box-shaped item being passed through the scan planes.

19. A method according to claim 14 wherein the first read plane is oriented at a first slant angle to the window in a first direction to acquire scan data of a two-dimensional image of the leading side of the item as the item is passed through the first read plane.

20. A method according to claim 19 further comprising
forming a second read plane transverse to the item direction by repeatedly reading through the first window, wherein the second read plane is formed with a direction of view at a second tilt angle to the first surface in a second direction from an end of the first window opposite the first end for acquiring a field of view of the fifth side of the item opposite the fourth side; wherein the second read plane is oriented at a second slant angle to the first window in a second direction to acquire, in combination with movement of the item, a second set of scan data of a two-dimensional image of the trailing side of the item as the item is passed through the second read plane.

21. A method according to claim 14 further comprising the steps of
forming the reader housing with a second surface generally orthogonal to the first surface and with a second window disposed in the second surface;
repeatedly reading through the second window along a second read plane and acquiring, in combination with movement of the item, scan data of a two-dimensional image of at least the fifth side of the item facing the second window as the item is passed through the second read plane.

22. A method according to claim 21 wherein the step of reading through the second window along a second read plane comprises reading through the second window along the second read plane at a first tilt angle to the second surface in a direction from one end of the second window toward the first window for acquiring a field of view of a side of the item facing away from the first window.

23. A method according to claim 14 wherein the reader housing comprises a second window disposed therein, the reader housing comprising an L-shape with the second window being oriented generally vertical, the method further comprising
acquiring, in combination with movement of the item, a second set of scan data of a two-dimensional image of at least the fifth side of the item facing the second window as the item is moved through the second read plane.

24. A system for reading optical codes on an item being passed in a given item direction through a read volume, comprising
a scanner housing having a first surface facing the read volume;
a first slot disposed in the first surface, the slot being elongated in one direction and oriented generally transverse to the given item direction, the slot having a narrow width parallel to the given item direction;
means for repeatedly reading through the first slot along a first read plane oriented at a first slant angle to the first surface in a rearward first direction, and acquiring, in combination with movement of the item, first scan data over two dimensions of at least a leading side of the item as the item is passed through the first read plane;
means for repeatedly reading through the first slot along a second read plane oriented at a second slant angle to the surface in a forward second direction, and acquiring, in combination with movement of the item, second scan data over two dimensions of at least a trailing side of the item as the item is passed through the second read plane;
a processor for processing the first and second scan data acquired.

25. A system according to claim 24 wherein the scanner housing comprises a second surface having a second window disposed therein, the scanner housing comprising an L-shape with one of the first and second surfaces being oriented generally horizontal and the other surface being oriented generally vertical, the system further comprising
means for repeatedly reading through the second window along a third read plane and acquiring scan data over two dimensions of at least a side of the item facing the second window as the item is passed through the third read plane.

26. A system for reading optical codes on an item being passed in a given item direction through a read volume, comprising
a scanner housing;
a slot disposed in a first surface of the scanner housing and facing the read volume, wherein, the slot being elongated in one direction and oriented generally transverse to the item direction, the slot having a narrow width parallel to the item direction;
a first scan mechanism for repeatedly scanning through the slot in a first read plane at a rearward first slant angle to the first surface in a first direction and along a single line to acquire, in combination with movement of the item, scanned data over two dimensions of at least a leading side of the item;
a second scan mechanism for repeatedly scanning through the slot in a second read plane at a forward second slant angle to the first surface in a second direction and along a single line to acquire, in combination with movement of the item, scanned data over two dimensions of at least a trailing side of the item;
a processor for processing the scanned data acquired.

27. A system according to claim 26 wherein scanned data is acquired over two dimensions of at least three sides of the item including the leading side, the trailing side, and a side facing the slot.

28. A system according to claim 26 wherein the first and second scan mechanisms acquire scanned data over two dimensions of at least three sides of the item, the item being a six-sided box-shaped object, including a first side comprising the leading side, a second side comprising the trailing side, a third side facing the slot, a fourth side transverse to the slot and proximate an operator position, a fifth side transverse to the slot and opposite the fourth side, and a sixth side opposite the third side.

29. A system according to claim 28 further comprising
a third scan mechanism for repeatedly scanning through the slot at a first tilt angle to the first surface in a first direction from a first end of the slot and along a single line to acquire scanned data over two dimensions of the fourth side of the item transverse to the slot.

30. A system according to claim 29 further comprising
a fourth scan mechanism, repeatedly scanning through the slot at a second tilt angle to the first surface in a second direction from a second end of the slot and along a single line to acquire scanned data over two dimensions of the fifth side of the item transverse to the slot.

31. A system according to claim 26 wherein the scanner housing is formed with a second surface generally orthogonal to the first surface and with a second window disposed in the second surface, wherein the system further comprising means for repeatedly reading through the second window along a third slant angle and acquiring, in combination with movement of the item, scan data of a two-dimensional image of at least a side of the item facing the second window as the item is passed by the second window.

32. A system according to claim 31 wherein the means for repeatedly reading through the second window comprises reading through the second window along the third slant angle at a first tilt angle to the second surface in a direction from one end of the second window toward the first surface for acquiring a field of view of a side of the item facing away from the first surface.

33. A system according to claim 26 wherein the slot comprises a first window, wherein the scanner housing comprises a second surface having a second window disposed therein, the scanner housing comprising an L-shape with one of the first and second surfaces being oriented generally horizontal and the other surface being oriented generally vertical, the system further comprising
means for repeatedly reading through the second window along a third slant angle and acquiring scan data over two dimensions of at least a side of the item facing the second window as the item is passed by the second window.

34. A method of reading optical codes on items being passed through a read volume, comprising the steps of
moving an item containing an optical code along an item direction through the read volume and past a first window, the first window being disposed in a first surface of a reader housing or platter and facing the read volume;
forming a first illumination plane by directing a plane of light, emitted from a set of light emitting diodes, into the read volume at a forward first angle to the first window;
forming a first read plane generally transverse to the item direction and generally coplanar with the first illumination plane by repeatedly reading with a linear or 2D imager through the first window, for acquiring a field of view of a first side of the item parallel to the first surface and parallel to the item direction from the forward first angle;
acquiring, in combination with movement of the item through the first read plane, a first set of scan data of a two-dimensional image of at least the first side of the item;
forming a second illumination plane by directing a second plane of light, emitted from said set of light emitting diodes into the read volume at a rearward second angle to the first window;
forming a second read plane generally transverse to the item direction and generally coplanar with the second illumination plane by repeatedly reading with said linear or 2D imager through the first window, for acquiring a field of view of at least the first side of the item from the rearward second angle;
acquiring, in combination with movement of the item through the second read plane, a second set of scan data of a two-dimensional image of at least the first side of item; and
processing the first set of scan data and the second set of scan data.

35. A method according to claim 34 wherein the step of moving an item containing an optical code comprises moving the item via manual manipulation by an operator, the method further comprising
compensating for variations in speed of the item occasioned by the item being manually moved through the read volume.

36. A method of reading an optical code on an item being moved via a conveyor, the conveyor having first and second conveyor sections separated by a relatively narrow gap therebetween, comprising the steps of
via the conveyor, passing the item from the first conveyor section to the second conveyor section over the gap;
repeatedly reading with a linear or 2D imager off a fold mirror along a first read plane oriented at a forward first slant angle to the conveyor through the gap in a forward direction, and acquiring, in combination with movement of the item, a first set of scan data of a two-dimensional image of a bottom side of the item as the item is passed through the first read plane;
repeatedly reading with a linear or 2D imager off a fold mirror along a second read plane oriented at a rearward second slant angle to the conveyor in a rearward direction, and acquiring, in combination with movement of the item, a second set of scan data of a two-dimensional image of the bottom side of the item as the item is passed through the second read plane;
processing the sets of scan data acquired.

37. A system for reading optical codes on an item being passed in a given item direction through a read volume, comprising
a scanner housing having a first surface facing the read volume;
a first window disposed in the first surface;
means for repeatedly reading with a linear or 2D imager off a fold mirror and then through the first window along a first read plane oriented at a first slant angle to the first surface in a rearward first direction, and acquiring, in combination with movement of the item through the first read plane, first scan data over two dimensions of at least a leading side of the item;
means for repeatedly reading with a linear or 2D imager off a fold mirror and then through the first window along a second read plane oriented at a second slant angle to the surface in a forward second direction, and acquiring, in combination with movement of the item through the second read plane, second scan data over two dimensions of at least a trailing side of the item;
a processor for processing the first and second scan data acquired.

* * * * *